US008860604B2

(12) United States Patent  (10) Patent No.: US 8,860,604 B2
Oswald  (45) Date of Patent: Oct. 14, 2014

(54) RADAR SYSTEM

(75) Inventor: Gordon Kenneth Andrew Oswald, Huntingdon (GB)

(73) Assignee: Cambridge Consultants Limited, Cambridge (GB)

( * ) Notice: Subject to any disclaimer, the term of this patent is extended or adjusted under 35 U.S.C. 154(b) by 280 days.

(21) Appl. No.: 12/602,496

(22) PCT Filed: May 29, 2008

(86) PCT No.: PCT/GB2008/001816
§ 371 (c)(1),
(2), (4) Date: Jun. 9, 2010

(87) PCT Pub. No.: WO2008/145993
PCT Pub. Date: Dec. 4, 2008

(65) Prior Publication Data
US 2010/0265122 A1    Oct. 21, 2010

(30) Foreign Application Priority Data
May 29, 2007    (GB) .................................... 0710209.8

(51) Int. Cl.
*G01S 13/58* (2006.01)
*G01S 13/42* (2006.01)
*G01S 13/95* (2006.01)
*G01S 13/87* (2006.01)
*G01S 13/02* (2006.01)

(52) U.S. Cl.
CPC ............... *G01S 13/951* (2013.01); *G01S 13/42* (2013.01); *Y02B 10/30* (2013.01); *G01S 2013/0263* (2013.01); *G01S 13/87* (2013.01)
USPC ............ 342/107; 342/109; 342/113; 342/133

(58) Field of Classification Search
USPC .................................. 342/107, 109, 113, 133
See application file for complete search history.

(56) References Cited

U.S. PATENT DOCUMENTS 3,828,348 A * 8/1974 Murray, Jr. ...................... 342/94
3,935,572 A   1/1976 Broniwitz et al.
4,241,347 A * 12/1980 Albanese et al. ............... 342/89

(Continued)

FOREIGN PATENT DOCUMENTS

EP    0 443 243 A2    8/1991
EP    1 571 462       9/2005

(Continued)

OTHER PUBLICATIONS

PCT Notification of Transmittal of the International Search Report and the Written Opinion of the International Searching Authority, or the Declaration for PCT Counterpart Application No. PCT/GB2008/001816, 19 pgs., (May 7, 2009).

(Continued)

*Primary Examiner* — Timothy A Brainard
(74) *Attorney, Agent, or Firm* — Blakely, Sokoloff, Taylor & Zafman LLP

(57) ABSTRACT

A radar system comprising a transmitter to transmit radar signals into a region, a receiver to receive return signals of said radar signals reflected from within the region wherein the transmitter and receiver are adapted for location on a structure at a wind farm, and a processor to process the return signals to extract wind farm associated data for said region.

23 Claims, 16 Drawing Sheets

(56) References Cited

U.S. PATENT DOCUMENTS

| | | | |
|---|---|---|---|
| 4,275,396 | A | 6/1981 | Jacomini |
| 4,318,102 | A | 3/1982 | Poirier |
| 5,231,402 | A | 7/1993 | Ludloff et al. |
| 5,262,782 | A | 11/1993 | Rubin et al. |
| 5,481,270 | A | 1/1996 | Urkowitz et al. |
| 5,485,157 | A | 1/1996 | Long |
| 5,568,151 | A | 10/1996 | Merritt |
| 6,288,672 | B1 | 9/2001 | Asano et al. |
| 6,400,306 | B1 | 6/2002 | Nohara et al. |
| 7,145,503 | B2 | 12/2006 | Abramovich et al. |
| 7,154,433 | B1 * | 12/2006 | Madewell ............... 342/160 |
| 7,195,445 | B2 | 3/2007 | Wobben |
| 7,626,536 | B1 * | 12/2009 | Rihaczek et al. ............ 342/96 |
| 7,916,068 | B2 | 3/2011 | Wicks et al. |
| 8,314,732 | B2 | 11/2012 | Oswald et al. |
| 2003/0142011 | A1 | 7/2003 | Abramovich et al. |
| 2003/0210169 | A1 * | 11/2003 | Steele et al. ................ 342/26 |
| 2004/0150552 | A1 * | 8/2004 | Barbella et al. ............ 342/109 |
| 2006/0179934 | A1 * | 8/2006 | Smith et al. ............. 73/170.11 |
| 2006/0203224 | A1 * | 9/2006 | Sebastian et al. ........... 356/4.09 |
| 2008/0001808 | A1 | 1/2008 | Passarelli, Jr. et al. |
| 2008/0111731 | A1 | 5/2008 | Hubbard et al. |
| 2009/0027257 | A1 | 1/2009 | Arikan et al. |
| 2009/0202347 | A1 | 8/2009 | Rugger |
| 2009/0303107 | A1 | 12/2009 | Ando |

FOREIGN PATENT DOCUMENTS

| | | |
|---|---|---|
| EP | 1 916 541 A1 | 4/2008 |
| FR | 2769373 A1 | 4/1999 |
| GB | 2 387 053 A | 10/2003 |
| WO | WO 97/14058 | 4/1997 |
| WO | WO 01/59473 | 8/2001 |
| WO | WO 2005/038488 | 4/2005 |
| WO | WO 2007/046082 | 4/2007 |
| WO | WO 2008/105892 A2 | 9/2008 |
| WO | WO 2009/144435 | 12/2009 |

OTHER PUBLICATIONS

PCT Notification of Transmittal of International Preliminary Examination Report for PCT Counterpart Application No. PCT/GB2008/001816, 8 pgs. (Oct. 21, 2009).

William H. Long, et al., "Chapter 17—Pulse Doppler Radar", Radar Handbook ($2^{nd}$ Edition), (edited by: Skolnik, Merrill I.), 1990 McGraw-Hill, retrieved from the Internet: http://www.knovel.com/web/portal/browse/display?_EXT_KNOVEL_DISPLAY_bookid=701&VerticalID=0, (1990).

Takayuki Inaba, "Element-Localized Doppler STAP (Space Time Adaptive Processing) for Clutter Suppression in Automotive Forward-Looking RADAR", Electronics and Communications in Japan, Part 1, vol. 90, No. 1, pp. 77-89, (2007).

Koen Van Caekenberghe, et al., "Monopulse-Doppler Radar Front-End Concept for Automotive Applications based on RF MEMS Technology", 2006 IEEE International Conference on Electro/Information Technology, 5 pgs., (May 2006).

Gaspare Galati, et al., "A short-range, high-resolution millimeter-wave surface movement radar", Annals of Telecommunication, vol. 52, No. 3-4, pp. 224-229, (1997).

PCT International Search Report for PCT Counterpart Application No. PCT/GB2008/001816 containing Communication relating to the Results of the Partial International Search Report, 2 pgs., (Mar. 4, 2009).

Merrill Skolnik, "Attributes of the Ubiquitous Phased Array Radar", IEEE Phased Array Systems and Technology Symposium, pp. 101-106, (Oct. 14-17, 2003).

Patents Act 1977: Search Report under Section 17 for United Kingdom Counterpart Application No. GB0710209.8, 1 pg., (Sep. 7, 2007).

PCT International Search Report for PCT Application No. PCT/GB2008/003997 containing Communication relating to the Results of the Partial International Search Report, 5 pgs., (Jun. 9, 2009).

James Perry, "Wind Farm Clutter Mitigation in Air Surveillance Radar", Radar Conference, 2007 IEEE, pp. 93-98, (Apr. 1, 2007).

Gerhard Greving, et al., "Application of the Radar Cross Section RCS for Objects on the Ground—Example of Wind Turbines", International Radar Symposium, IRS 2006, pp. 1-4, (May 21, 2008).

Cambridge Consultants, "Cambridge Consultants Presents Low-Cost Solution to Current Wind Farm Conflict", retrieved from the Internet on Mar. 23, 2009: http://www.cambridgeconsultants.com/news_pr202.html, 2 pgs., (Feb. 27, 2008).

Search and Examination Report for GB1021882.4, Aug. 13, 2012, 3 pages.

Extended European Search Report for EP Counterpart Patent Application No. 11168622.6-2220, 8 pgs. (Aug. 25, 2011).

Liao et al., Identification of Air Targets Based on Dopple Spectrum Features, ATR Key Laboratory, National University of Defense Technology, Changsha China, Modern Radar, vol. 27, No. 6, Jun. 2005, 4 pages.

* cited by examiner

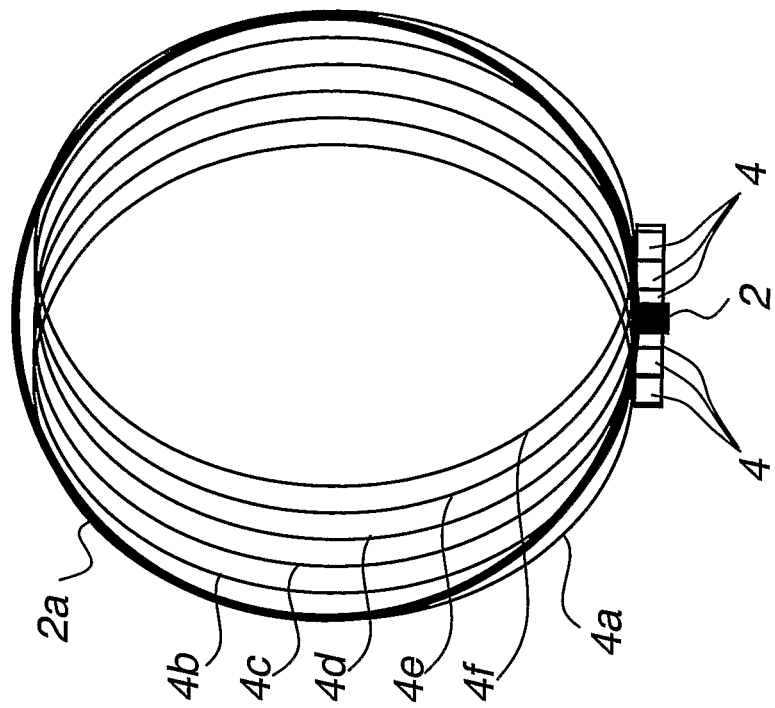
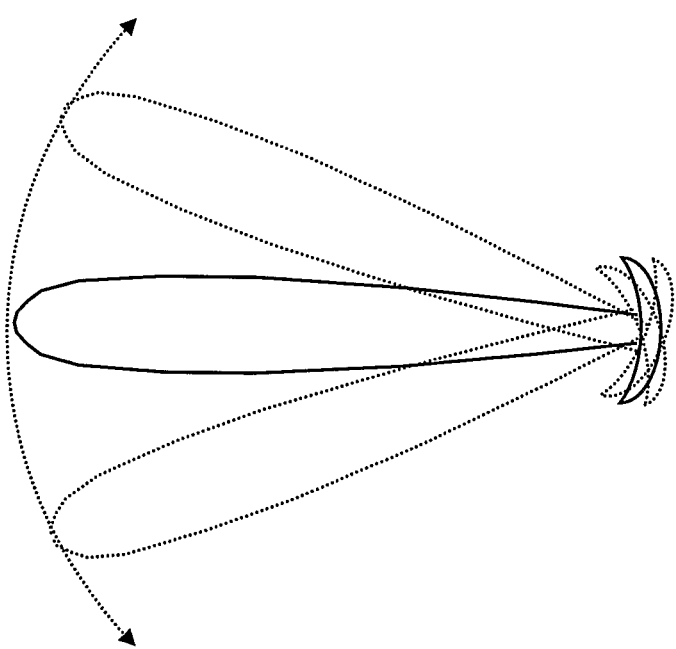

RADAR SYSTEM

CROSS-REFERENCE TO RELATED APPLICATIONS

This patent application is a U.S. National Phase application under 35 U.S.C. 371 of International Application No. PCT/GB2008/001816, filed on May 29, 2008, entitled RADAR SYSTEM, which claims priority to Great Britain patent application number 0710209.8, filed May 29, 2007.

FIELD

The invention relates to a radar system and to a method of enhancing radar system capability. The invention relates in particular to a radar system with enhanced detection capabilities in a region affected by clutter, structures and moving structures (for example wind turbines) which interfere with radar signals.

BACKGROUND

There is increasing concern over the effects of new structures, and in particular large man made structures such as wind turbines, on the capability of new and existing radar systems, for example air traffic control, marine, and/or air defence systems.

Radar systems are generally designed to differentiate between radar returns containing reflections from many objects, both moving and stationary. Such reflected signals (collectively termed clutter) may for example originate from stationary objects such as trees, the ground and even the wind turbine towers themselves. Whilst existing radars may be designed to differentiate between clutter and moving objects based on the Doppler effect, there are many effects associated with structures such as wind turbines which contribute to a significant reduction in radar performance. The fact that large numbers of such structures are typically arranged in relatively close proximity to one another exacerbates the problem.

Wind farms, for example, typically comprise an array of large wind turbines, spaced out over an off-shore or inland area that may extend many kilometers. Each wind turbine typically comprises three principal elements: a tower, a nacelle and a blade assembly. The size and configuration of turbines may differ significantly from location to location (there are currently in the region of 40 or so different turbine designs in the UK alone). Generally, however, each turbine comprises a vertically-mounted blade assembly (having a horizontal rotational axis), and a tower exceeding a height of many tens of meters, or potentially over a hundred meters. The size of such structures, combined with the presence of large moving parts (e.g. the blade assemblies), means that the turbines act as effective scatterers of radio signals, with metal towers and/or blade assemblies in particular reflecting a high proportion of the transmitted signal back towards the radar and distorting returns from objects of interest. Thus, the turbines provide spurious moving targets for a radar system and cause shadowing or apparent modulation of signals associated with targets of interest, such as aircraft, marine vessels or the like.

Discriminating against spurious moving targets such as those associated with a moving blade assembly is complex and as such consumes significant additional processor time compared, for example, with simple static clutter reduction or the like.

The large size of the unwanted targets may cause undesirable effects such as saturation of a radar receiver, or the like. A large reflection, for example, can result in amplitude limiting within the receiver/signal processing thereby causing distortion and possibly resulting in reduced sensitivity and hence degraded detection capability.

Objects located behind the turbine(s) (from the perspective of the radar) may lie in the 'shadow' of the turbine. A large portion of the radar energy is blocked by the turbine and is thus lost by reflection in other directions. The radar energy that partially fills the shadow region behind the turbine (for example by diffraction) therefore represents only part of the original signal energy and so the field strength behind the turbine is diminished over a region behind the turbine. Shadowing may therefore result in missed detections.

The rotation of the blades also causes modulation effects, for example time modulation of the return signal as the blades present varying aspect angles, modulation or "chopping" of the radar cross section of objects behind the blade (as the blades intermittently obscure the returns from other objects), and Doppler modulation effects as a result of the blades' movement in the direction of the radar. Such modulation effects may cause a wanted target to be missed or to be mis-classified.

Other potential effects include the reflection and re-reflection (cascading reflection) of signals between turbines before they are returned to the radar.

Degradation in the capability of radar systems such as air traffic control systems to accurately detect and track targets of interest whilst discriminating against spurious targets is of particular concern because of the potential impact on aircraft safety.

There is therefore a need for improvements to enhance the function of important radar systems such as those used in air traffic control and air defence. There is also a more general need for radar systems which are resistant to the negative effects of large structures and in particular large man-made structures having moving parts, such as wind turbines.

The present invention aims to provide an improved radar system, useful in this and/or in other cluttered scenarios.

International Patent Application having publication number WO01/059473, which names Cambridge Consultants Ltd as patent applicant and whose disclosure is incorporated by reference, discloses a radar system which comprises apparatus for obtaining positional information relating to an object, the apparatus comprising: a warning zone definition stage for defining a warning zone (in two or three dimensions) within a detection field of the apparatus; and a discrimination stage for determining whether a detected object is within the warning zone; in which the warning zone is preferably defined as a three-dimensional region within the detection field.

International Patent Application having publication number WO97/14058, which names Cambridge Consultants Ltd as patent applicant and whose disclosure is incorporated by reference, discloses apparatus for and method of determining positional information for an object, including a method for determining the position of an object by means of detecting the relative timing of probe signals returned by said object at a plurality of spaced apart locations.

SUMMARY

Radar Systems for Cluttered Environments

In one aspect of the present invention there is provided a radar system for location within a cluttered environment, the radar system comprising: means for transmitting (preferably a transmitter) radar signals into a region (or a volume of interest); means for receiving (preferably a receiver) return signals of said radar signals when reflected from within said region (or volume of interest), wherein said transmitting and receiving means are configured for location within the cluttered environment; and means for processing (preferably a processor) the return signals to extract data for said region including data associated with clutter in said region.

In another aspect of the present invention a radar system is provided which comprises: means for transmitting (preferably a transmitter) radar signals into a region (or a volume of interest); means for receiving (preferably a receiver) return signals of said radar signals when reflected from within said region (or volume of interest), wherein said transmitting and receiving means are adapted for location on a structure at a wind farm; and means for processing (preferably a processor) the return signals to extract wind farm associated data for said region.

It has been appreciated pursuant to the present invention location of radar sensors at wind farms, whilst counter-intuitive because of the well known deleterious effects of large metallic structures (and especially those having moving parts) such as wind turbines on radar signal processing, has a number of distinct and surprising advantages. It makes use of existing infrastructure (power and mechanical support); it reduces the range of targets within the area of the turbine array; and it increases angular diversity between turbines. In addition, locating a receiver and/or a transmitter at a wind-farm allows information of relevance to the wind farm itself to be extracted. For example, this may include information on objects (such as marine vessels or aircraft) moving in a volume of interest in close proximity to the wind-farm, to be detected where local air traffic control, navel, or air defence radar would have difficulty.

The transmitting means may comprise a static transmitter.

Preferably the transmitting means has a first aperture and the receiving means a second aperture such that said first aperture is of a different size to said second aperture. The first aperture is preferably smaller than said second aperture. The receiving means may comprise a plurality of sub-arrays each of which may have a sub-aperture of substantially equal size and shape to the first aperture.

The transmitting means is preferably configured to persistently illuminate said region, preferably without being sequentially scanned or directed.

The processing means may be configured for forming multiple receiving beams.

Coherent integration of return signals may occur subject to a limit on the range and/or range rate associated with a corresponding observation represented by the return signals. The limit may be inversely proportional to an operating frequency of the radar system and/or may be proportional to the square of the speed of light. The range may be limited in inverse proportion to the maximum magnitude of the range rate and/or the range rate may be limited in inverse proportion to the maximum range.

The limit is preferably expressed by the inequality:

$$\left(\left|\frac{dR}{dt}\right|(\max) \times R(\max)\right) \leq \frac{c^2}{(8 \times F_{op})}$$

where R is the range and dR/dt is the range rate associated with the observation, c is the speed of light, and $F_{op}$ is operating frequency of the radar system.

The transmitting means is preferably configured to illuminate said whole region with a broad beam, may be configured to illuminate a whole volume of interest simultaneously, may be configured to illuminate said region with a coherent signal modulated to permit range resolution, and/or may be configured to illuminate said region with a coherent signal modulated as a regular sequence of pulses. The transmitting means may be configured to illuminate targets in the region at a rate (for example a pulse rate) sufficient to exceed the Nyquist limit for Doppler shifts associated with the targets.

The processing means may be configured to assess the significance of an observation represented by a return signal preferably only after data relating to the observation has been extracted, stored, and analysed. The processing means may be configured to classify a target represented by an observation only after data relating to the observation has been extracted, stored, and analysed. The processing means may be configured to identify observations of interest from said extracted data and preferably stores historical data for said identified observations.

The historical data may comprise phase and/or amplitude histories. The processing means may be configured to form tracks for said targets based on processing and interpretation of said historical data and/or may be configured to discriminate between significant and insignificant observations (and/or targets representing one class or another) based on said historical data.

The processing means may be configured to store extracted data representing an observation in process pixels each of which represents a unique set of attributes. The attributes for each pixel may comprise a combination comprising at least two of time, range, range rate and/or Doppler frequency for the associated observation. The attributes for each pixel may comprise at least one of beam number, sub-array number and/or element number for the associated observation. The processing means may be configured to store a characteristic of a return signal representing the observation in an associated pixel. The characteristic may comprise at least one of amplitude, phase and frequency. The observation may represent one of a target, an item of clutter, or a 'null'.

The receiving means preferably comprises at least one array comprising a plurality of receiving elements (or sub-arrays), each element may be configured to receive signals from substantially a whole volume of interest, thereby forming an associated signal channel. The receiving means may comprise a plurality of said arrays (or sub-arrays).

The processing means may be configured for forming a plurality of beams by combining different signal channels with suitable amplitude and/or phase weightings. The processing means may be configured for forming a plurality of beams having substantially a different look direction. The processing means may be configured for forming a plurality of apertures with beams having substantially the same look direction. The beams are preferably formed for each of a plurality receiving elements. The beams may be formed for each of the plurality of sub-arrays of receiving elements.

The processing means may be configured for monopulse angular measurement using a plurality of the beams. The monopulse angular measurement may comprise phase monopulse angular measurement. The monopulse angular measurement may comprise amplitude monopulse angular measurement.

The receiving means may have a substantially larger total aperture than said transmitting means. The processing means may be configured for determining the amplitude, frequency, delay and/or phase of said return signals using a signal which is coherent with the transmitted radar signal.

The receiving means may comprise a planar array of receiving elements and/or may comprise a non-planar array of receiving elements conformal to a known shape.

The radar system is preferably located at the wind farm. The radar system preferably comprises a holographic radar.

The processing means may be configured to process signals received by the sub-arrays in a first data stream and a second data stream in parallel. Each data stream may be processed using different amplitude and/or phase weightings. The amplitude and/or phase weightings used for the first data stream may be configured to provide a null in a direction of a land or sea surface thereby to reject surface targets. Similarly, the amplitude and/or phase weightings used for the second data stream may be configured to provide a null in the direction of raised objects thereby to reject such objects in favour of surface targets.

Asymmetric Aperture Aspects

The transmitting means preferably has a first aperture; and said receiving means preferably has a second aperture; wherein said second aperture is preferably of a different size to said first aperture.

According to another aspect of the present invention there is provided a radar system for location in a cluttered environment, the radar system comprising: means for transmitting radar signals into a region, said transmitting means having a first aperture; means for receiving return signals of said radar signals, reflected from within said region, said receiving means having a second aperture; and means for processing the return signals to extract data including clutter related data; wherein said second aperture is of a different size to said first aperture.

The transmitting means may comprise a static transmitter.

Preferably the transmitting means has a first aperture and the receiving means a second aperture such that said first aperture is of a different size to said second aperture. The first aperture is preferably smaller than said second aperture. The receiving means may comprise a plurality of sub-arrays each of which may have a sub-aperture of substantially equal size and shape to the first aperture.

The transmitting means is preferably configured to persistently illuminate said region, preferably without being sequentially scanned or directed.

The processing means may be configured for forming multiple receiving beams.

Coherent integration of return signals may occur subject to a limit on the range and/or range rate associated with a corresponding observation represented by the return signals. The limit may be inversely proportional to an operating frequency of the radar system and/or may be proportional to the square of the speed of light. The range may be limited in inverse proportion to the maximum magnitude of the range rate and/or the range rate may be limited in inverse proportion to the maximum range.

The limit is preferably expressed by the inequality:

$$\left(\left|\frac{dR}{dt}\right|(\max) \times R(\max)\right) \leq \frac{c^2}{(8 \times F_{op})}$$

where R is the range and dR/dt is the range rate associated with the observation, c is the speed of light, and $F_{op}$, is operating frequency of the radar system.

The transmitting means is preferably configured to illuminate said whole region with a broad beam, may be configured to illuminate a whole volume of interest simultaneously, may be configured to illuminate said region with a coherent signal modulated to permit range resolution, and/or may be configured to illuminate said region with a coherent signal modulated as a regular sequence of pulses. The transmitting means may be configured to illuminate targets in the region at a rate (for example a pulse rate) sufficient to exceed the Nyquist limit for Doppler shifts associated with the targets.

In-Fill Application Aspects

The radar system is preferably configured for detecting objects in a surveillance area; the region is preferably a region within the surveillance area, which has a detection capability which is degraded by wind farm associated interference; the return signals may therefore be reflected from objects located within the region; and the processing means is preferably configured for extracting wind farm associated data for the objects and for analysing the wind farm associated data to enhance detection of the objects within the region.

The radar system preferably further comprises primary means for receiving radar signals reflected from an object when said object is located within a surveillance area; wherein the receiving means which is adapted for location at the wind farm is a secondary means for receiving return signals reflected from an object when said object is located within a region within the surveillance area, wherein said region has a detection capability which is subject to wind farm associated degradation when compared to the rest of the surveillance area; and wherein the processing means is configured for: (i) processing said return signals received by said primary receiving means to detect said object within said surveillance area; (ii) for processing said signals received by said secondary receiving means to extract said wind farm associated data for said object when said object is located within said region; and (iii) for analysing said wind farm associated data to enhance the detection capability within said region.

According to another aspect of the present invention there is provided a radar system (or service) adapted to operate in the presence of primary means for receiving radar signals reflected from an object of interest within a surveillance area; and comprising secondary means for receiving radar signals reflected from said object when said object is located within a clutter-affected region within said surveillance area; and means for processing said signals received by said secondary receiving means to detect said object within said region; wherein said processing means is configured to process said signals received by said secondary receiver means to enhance detection within said region and to provide the results to said primary means.

According to another aspect of the present invention there is provided a radar system comprising: primary means for receiving radar signals reflected from an object of interest within a surveillance area; secondary means for receiving radar signals reflected from said object when said object is located within a region within said surveillance area; and means for processing said signals received by said primary receiving means to detect said object within said surveillance area; wherein said processing means is configured to process said signals received by said secondary receiver means to enhance detection within said region.

Thus the radar system advantageously augments the function of existing and/or new surveillance radar systems in the presence of new structures, for example to ameliorate the effect of wind farms on air traffic control radar systems. Advantageously, the secondary receiving means provides additional coverage to fill in areas degraded by the wind farm (or other such group of interfering structures). Preferably the secondary receiving means includes a transmitting element arranged such that it illuminates the wind farm itself in a way that does not suffer such degradation.

Preferably the secondary receiving means comprises a suitable form of a radar sensor (or group of sensors) mounted at a wind farm (or the like) for example attached to a turbine (or group of turbines).

A preferred form of the radar sensor is a static sensor (i.e. one that does not require a rotating antenna) thereby avoiding mechanical interference with the turbines. A static sensor has the further advantages of ease of installation and reduced susceptibility to the harsh environment to be expected at a wind farm. Many wind farms, for example, are sited offshore and as such are subjected to particularly severe weather and stormy seas.

The radar sensor may comprise a static array of transmitting and/or receiving elements (for example similar to that described in WO01/059473) whose region of sensitivity may be adjusted. More specifically the sensitivity of the sensor array may be adjustable to define a region which coincides with a region of reduced detection capability (or degraded radar performance). The ability of the sensor array to measure the position of targets is preferably provided by calculation of amplitude and/or phase relationships (and/or) delays between signals received at different elements or combinations of elements of the receiving array (for example as described in WO97/14058).

Each radar sensor preferably has a wide field of view and can measure directions in both azimuth and elevation. Wider angular coverage 360 degree coverage may be provided by installing two or more radar sensors comprising, for example, planar antenna arrays pointed appropriately. Alternatively or additionally wider angular coverage may be provided by one or more radar sensors comprising, for example non-planar arrays. In the case of a wind farm the radar sensors may be positioned separately, may be located at different positions around the perimeter of a turbine support shaft, or may be attached to different turbine supports.

Data related to targets detected by the radar sensors may be communicated by a wireless link to processing means associated with the primary transmitter/receiver (e.g. main air traffic control system or systems) for integration with similar data generated by other radar sensors. The processing means may comprise suitable computer software or the like.

The integration of target data is preferably simplified for example by defining a detection zone for the secondary receiver means which substantially matches a region of reduced radar performance. The detection zone may be defined in a similar manner to the 'warning zone' described in WO01/059473.

The region is preferably a region having a reduced detection capability. The detection capability may be degraded by interference from at least one structure or a multiplicity of such structures. The structures may have at least one moving part and/or may have a size comparable to or larger than the object detected (indeed the size may be significantly larger than the object detected). The or each structure may be capable of causing multiple multi-path and/or cascading reflections (either in isolation or in combination with other such structures) and/or may be a man made structure. The structure(s) may be largely metallic and/or may be designed for the production of electricity. The or each structure is preferably a wind turbine.

The or each secondary receiving means may be located on the or at least one of the structure(s).

The radar system may comprise means for communicating data corresponding to the radar signals received by the secondary receiving means to the processing means. The communicating means may comprise wireless or optical communicating means.

The secondary receiving means may be located remotely from the primary receiving means at a location within or at the edge of the region.

The processing means may comprise a detection zone definition stage for defining a detection zone for said secondary receiving means within a detection field of said secondary receiving means. The processing means may comprise a discrimination stage for determining whether a detected object is within the detection zone. The detection zone may be defined as being substantially coincident with said region. The detection zone may be contained within and may be smaller than the detection field of the secondary receiving means. The shape of the detection zone may be dissimilar to the shape of the detection field of the secondary receiving means. The shape of the detection zone may be non-circular or non-spherical. The detection zone definition stage may include an algorithm that defines a detection zone as a function of a coordinate within the detection field.

The processing means may comprise an object location stage preferably for determining the position of a detected object within the detection field of the apparatus. The discrimination stage may include a coordinate generating stage for generating a coordinate of a detected object, which coordinate may then compared with the detection zone.

The discrimination stage may be operable to determine the coordinates of the detected object and preferably to compare the determined coordinates with the coordinates of the detection zone preferably to determine whether the object is within the detection zone.

The detection zone definition stage may define at least a limiting value of one or more ordinates of a coordinate within the detection field. The detection zone definition stage may define at least a limiting value of one or more angles of a polar coordinate within the detection field. The detection zone definition stage may define at least a limiting value of a range of a polar coordinate within the detection field. The detection zone may include a plurality of discontinuous spatial regions. The detection zone may be limited in range and/or may be approximately cuboid.

The discrimination stage may be operative to generate an output signal indicative that the object is within the detection zone. The discrimination stage may be operable to apply different logic to at least two of the zones.

The detection zone definition stage may define a plurality of non-coextensive detection zones, and preferably in which the discrimination stage is operative to generate an output signal indicative of which of the plurality of detection zones contains the object.

The discrimination stage may be operative to analyse a characteristic of an object outside of the detection zone and/or may be operable to track an object outside the detection zone and to predict its entry into the detection zone.

The processing means may be configured for definition and redefinition of said detection zone in dependence on requirements.

The secondary receiving means preferably comprises an antenna array having at least one (preferably two) receiving elements for receiving said reflected radar signals. The array may comprise at least one transmitting element for transmitting radar signals for reflection from said object of interest.

The antenna array may be a planar array or may be a non-planar array. The antenna array may be arranged for receiving a plurality of signals indicative of an azimuth of the object and wherein said processing means may be configured for determining said azimuth from said signals.

The antenna array may be arranged for receiving a plurality of signals indicative of an elevation of said object and wherein said processing means may be configured for determining said elevation from said signals.

The radar system may comprise a plurality of the secondary receiving means arranged in geographical association with said region (preferably at different locations within and/ or at the edge of said region).

According to another aspect of the invention there is provided a radar system for enhancing detection of an object within a region of a surveillance area, wherein detection capability within said region is degraded by interference caused by at least one structure; the radar system comprising: means for receiving radar signals reflected from said object when said object is located within said region; wherein said receiving means is located on the or at least one of the structure(s).

The detection capability may be degraded by interference from a multiplicity of the structures. The or each structure may have at least one moving part and/or may have a size comparable to or larger than (or significantly larger than) the object detected. The or each structure may be capable of causing multiple multi-path and/or cascading reflections (either in isolation or in combination with other such structures). The or each structure may be a man made structure and/or may be a largely metallic structure. The or each structure may be designed for the production of electricity. The or each structure is preferably a wind turbine. The or each secondary receiving means may be located on the or at least one of the structure(s).

The radar system preferably comprises a plurality of the receiving means, each of the receiving means being arranged on the or at least one of the structure(s).

According to another aspect of the invention there is provided a method of enhancing radar system capability comprising: receiving radar signals reflected from an object of interest within a surveillance area at a primary receiving means; receiving radar signals reflected from said object when said object is located within a region within said surveillance area at a secondary receiving means; integrating said signals received at said primary receiving means with said signals received at said secondary receiving means to enhance detection within said region.

Environmental Application Aspects

The returned signals preferably comprise indicators of prevailing environmental conditions in the region; and the processing means is preferably configured for extracting wind farm associated data for said indicators and preferably for analysing said data to determine operating parameters for said wind farm.

According to another aspect of the invention there is provided a radar system comprising: means for transmitting radar signals into a region; means for receiving return signals of said radar signals reflected from within said region, wherein said transmitting and receiving means are adapted for location on a structure at a wind farm; and means for processing the return signals to extract wind farm associated data for said region; wherein the returned signals comprise indicators of prevailing environmental conditions in said region, and said processing means is configured for extracting wind farm associated data for said indicators and for analysing said data to determine operating parameters for said wind farm.

The indicators may comprise indications of changes in air borne moisture and/or precipitation characteristics and/or may comprise indications of fluid flow characteristics. The fluid flow characteristics may comprise characteristics of air flow, may comprise wind shear and/or turbulence characteristics, and/or may comprise characteristics of vertical air flow stratification.

The processing means may be configured for processing said return signals to resolve different layers of vertical air flow stratification using, for example, vertical receiver beamforming.

The receiving means may comprise an array of receiving elements and processing means may be configured for processing said return signals to resolve different layers of vertical air flow stratification by analysing Doppler frequencies and/or phases across the receiving array.

The fluid flow characteristics may comprise characteristics of water movement, for example, characteristics of waves. The processing means may be configured for processing the return signals to discriminate between indicators of air flow characteristics and indicators of surface characteristics. The surface characteristics may comprise characteristics of waves.

The processing means may be configured to output signals for controlling said operating parameters. The control signals may comprise signals for modifying the pitch of at least one blade of at least one wind turbine, may comprise signals for modifying the pitch of the at least one blade over time as the blade rotates, and or may comprise signals for modifying the direction at which at least one wind turbine faces. The control signals may comprise signals for feathering the blades of at least one wind turbine, may comprise visual or audio signals for alerting an operator to said operating parameters, and or may comprise signals for interpretation by a controller for automatic control of said operating parameters.

Other Method Aspects

According to another aspect of the invention there is provided a method for obtaining information about a region including or in the vicinity of a wind farm, the method comprising: transmitting radar signals into a region from a location at the wind farm; receiving, at the wind farm, return signals of the radar signals reflected from within the region; and processing the return signals to extract wind farm associated data for the region.

The radar system may be configured for detecting objects in a surveillance area, the region may be a region within the surveillance area which has a detection capability which is degraded by wind farm associated interference, and the return signals may be reflected from objects located within the region; and the processing step may comprise extracting wind farm associated data for the objects and analysing the wind farm associated data to enhance detection of the objects within the region.

The returned signals may comprise indicators of prevailing environmental conditions in said region; and said processing step may comprise analysing said extracted data to determine operating parameters for said wind farm.

According to another aspect of the invention there is provided a method for determining operating parameters for a wind farm; transmitting radar signals into a region from a wind farm, the method comprising: receiving return signals of said radar signals reflected from within said region at said wind farm; and processing the return signals to extract wind farm associated data for said region wherein the returned signals comprise indicators of prevailing environmental conditions in said region; and analysing, in said processing step, said extracted data to determine operating parameters for said wind farm.

According to another aspect of the invention there is provided a method for extracting data in a cluttered environment, the method comprising: transmitting radar signals into a region using a transmitter having a first aperture; receiving return signals of said radar signals, reflected from within said region, using a receiver having a second aperture; and processing the return signals to extract data including clutter related data; wherein said second aperture used in said receiving step is of a different size to said first aperture used in said transmitting step.

Other Aspects

According to another aspect of the invention there is provided a radar system comprising: a transmitter to transmit radar signals into a region; a receiver to receive return signals of said radar signals reflected from within said region, wherein said transmitter and receiver are adapted for location on a structure at a wind farm; and a processor to process the return signals to extract wind farm associated data for said region.

The radar system may be configured to detect objects in a surveillance area. The region may be a region within said surveillance area, which region has a detection capability which is degraded by wind farm associated interference. The return signals may be reflected from objects located within said region. The processor may be configured to extract wind farm associated data for said objects and to analyse said wind farm associated data to enhance detection of said objects within said region.

The returned signals may comprise indicators of prevailing environmental conditions in said region, and said processor may be configured to extract wind farm associated data for said indicators, and to analyse said data to determine operating parameters for said wind farm.

According to another aspect of the invention there is provided a radar system comprising: a primary receiver to receive radar signals reflected from an object of interest within a surveillance area; a secondary receiver to receive radar signals reflected from said object when said object is located within a region within said surveillance area; and a processor to process said signals received by said primary receiver to detect said object within said surveillance area; wherein said processor is configured to process said signals received by said secondary receiver to enhance detection within said region.

According to another aspect of the invention there is provided a radar system comprising: a transmitter to transmit radar signals into a region; a receiver to receive return signals of said radar signals reflected from within said region, wherein said transmitter and receiver are adapted for location on a structure at a wind farm; and a processor to process the return signals to extract wind farm associated data for said region; wherein the returned signals comprise indicators of prevailing environmental conditions in said region, and said processor is configured to extract wind farm associated data for said indicators and to analyse said data to determine operating parameters for said wind farm.

According to another aspect of the invention there is provided a radar system for location in a cluttered environment, the radar system comprising: a transmitter to transmit radar signals into a region, said transmitter having a first aperture; a receiver to receive return signals of said radar signals reflected from within said region, reflected from within said region, said receiver having a second aperture; and a processor to process the return signals to extract data including clutter related data; wherein said second aperture is of a different size to said first aperture.

A preferable embodiment of the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

BRIEF DESCRIPTION OF THE DRAWINGS

A preferable embodiment of the invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

A preferable embodiment of the invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

According to the present invention, there is provided a radar system as set out in the corresponding independent claims. Other preferable features of the invention are recited in the dependent claims.

The invention will now be described by way of example only with reference to the attached figures in which:

FIGS. 1(a) and 1(b) illustrate, in simplified plan, the fields of view associated with two different types of radar.

Figure 2:
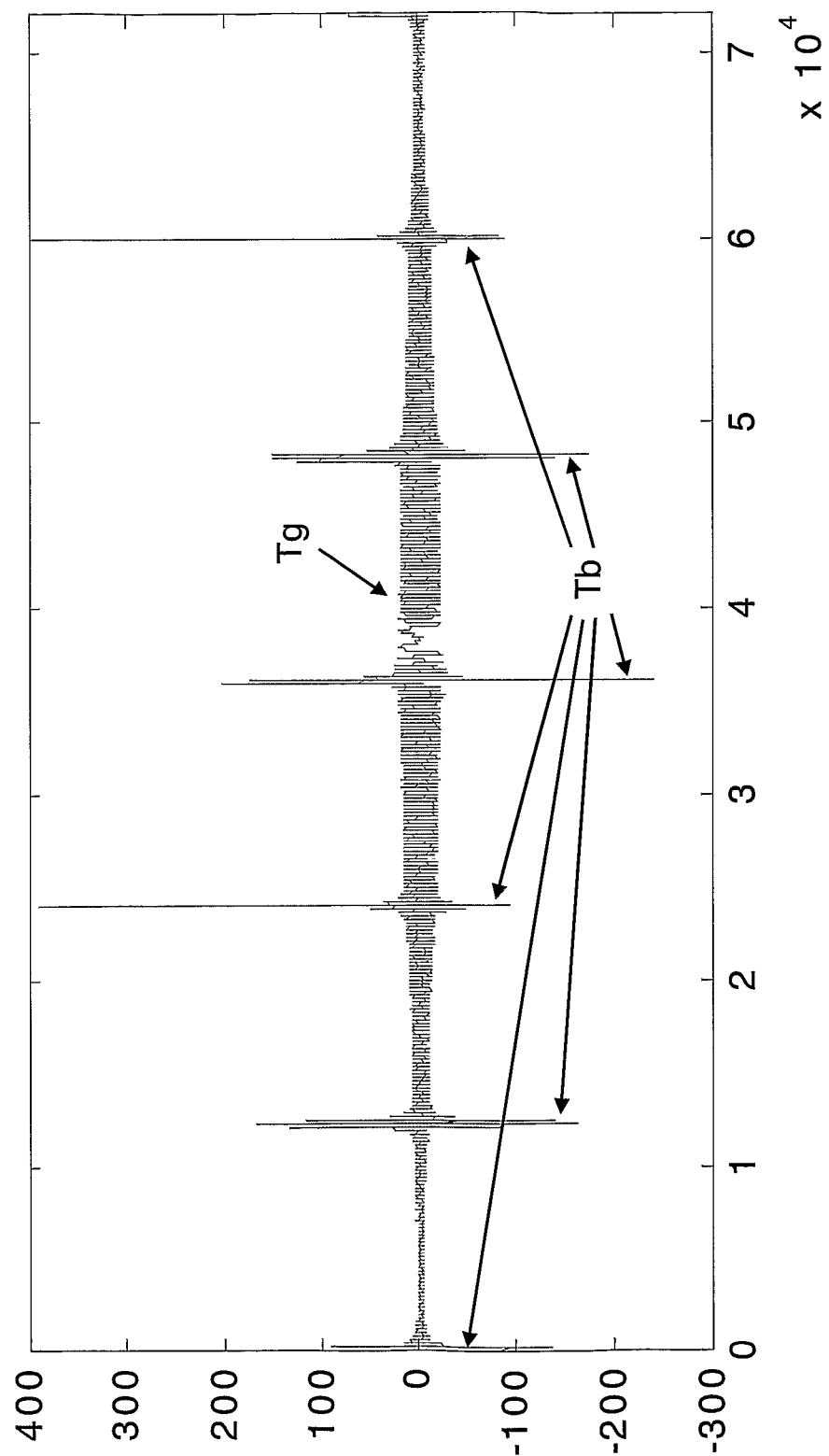
Figure 3:
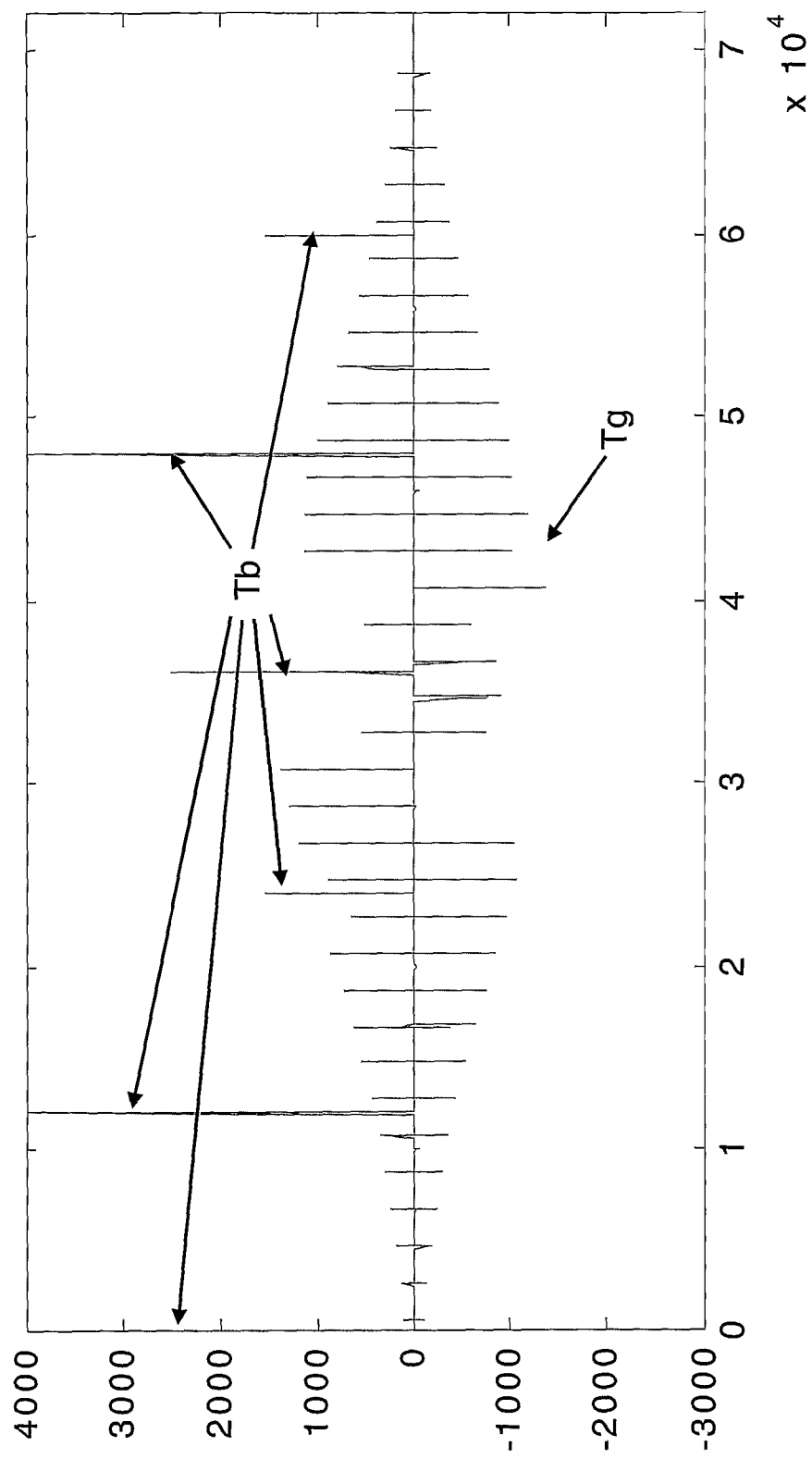
Figure 4:
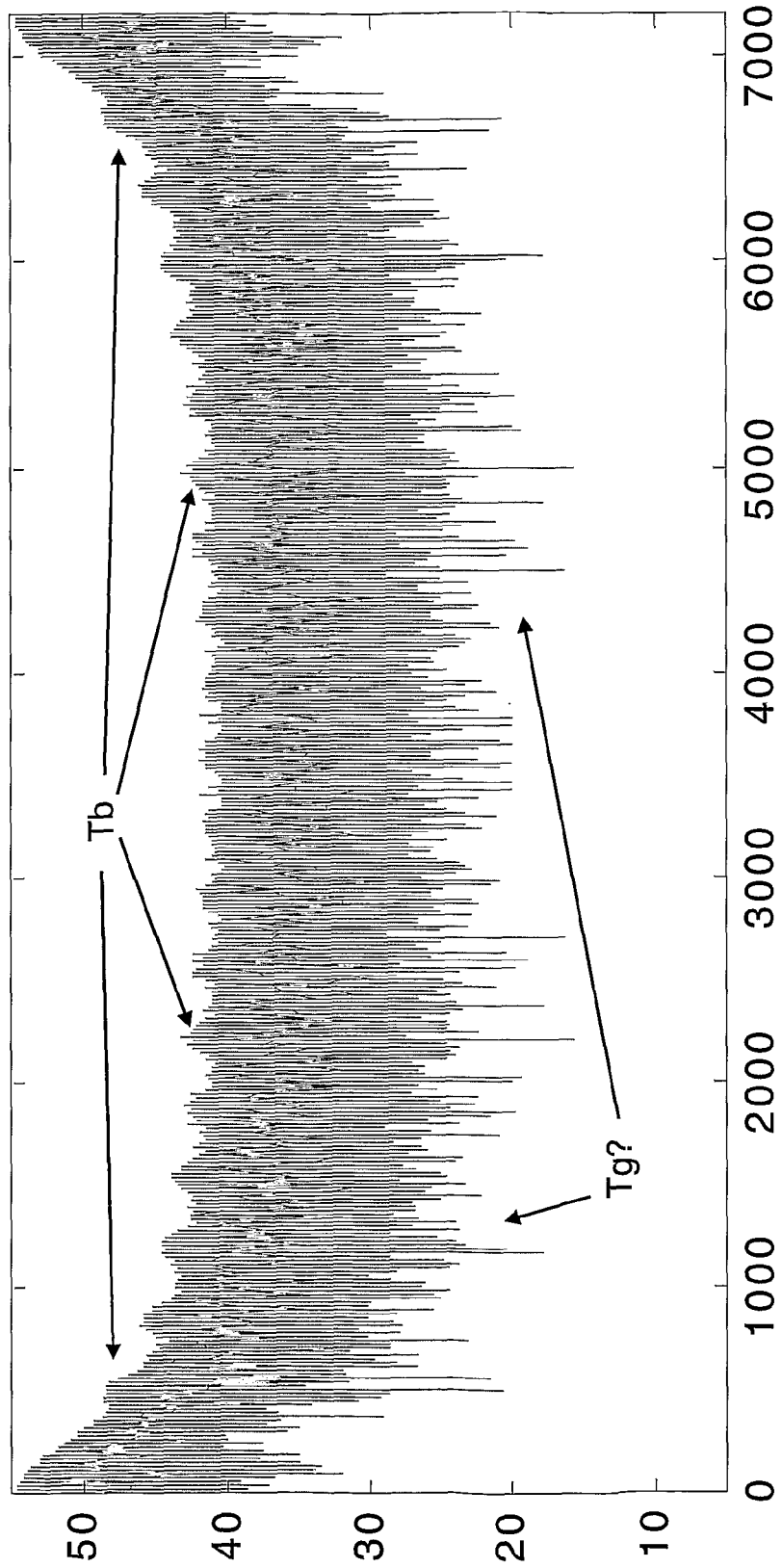
Figure 5:
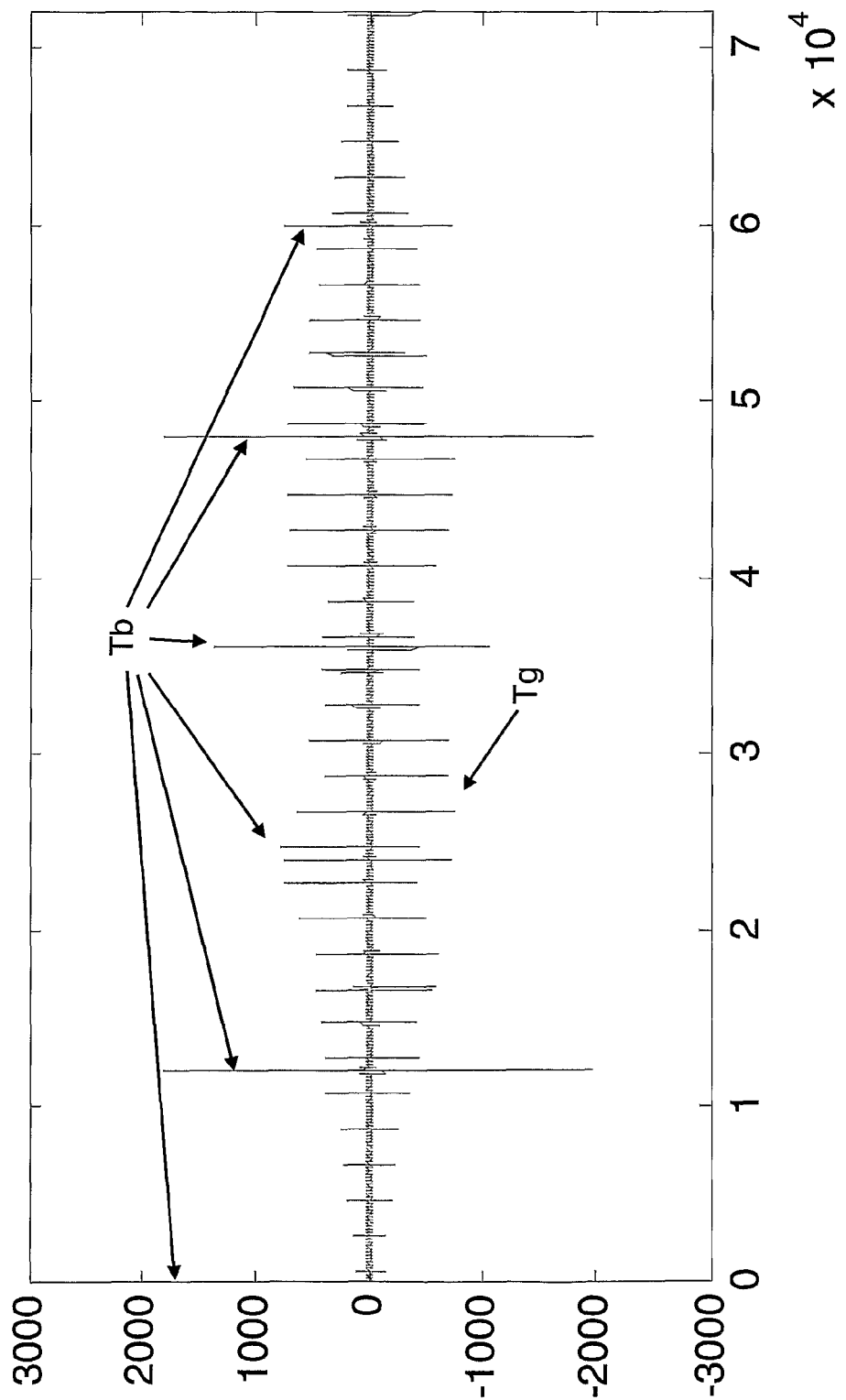
Figure 6A:
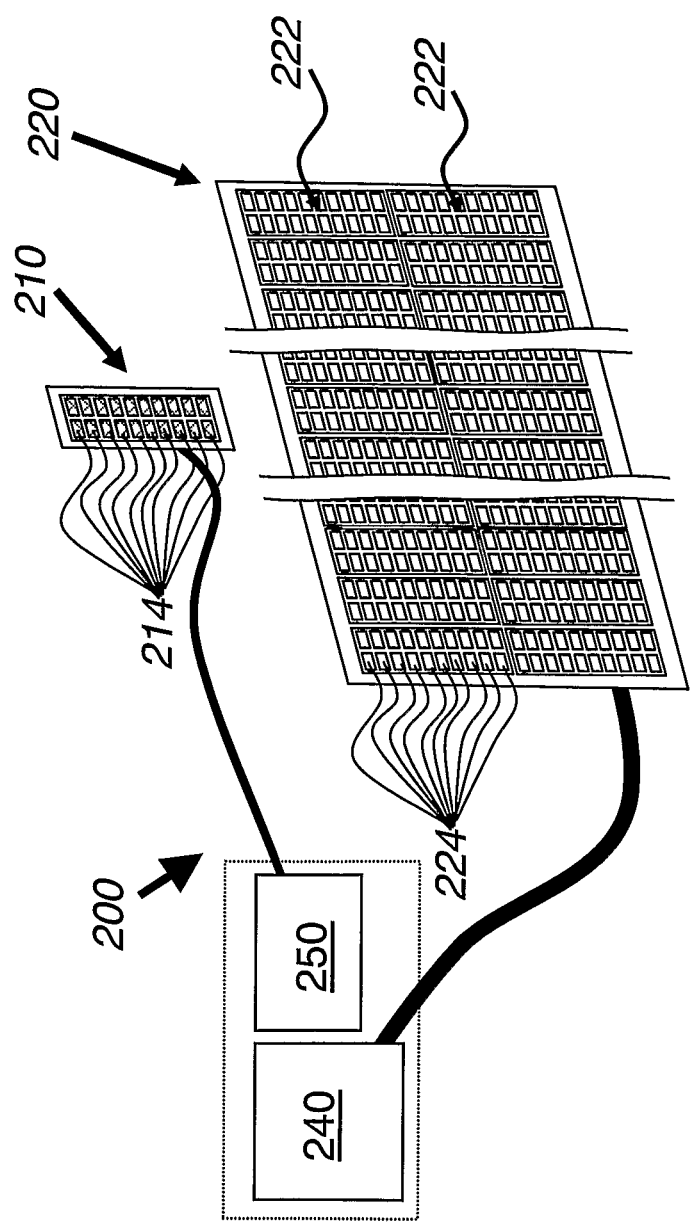
Figure 6B:
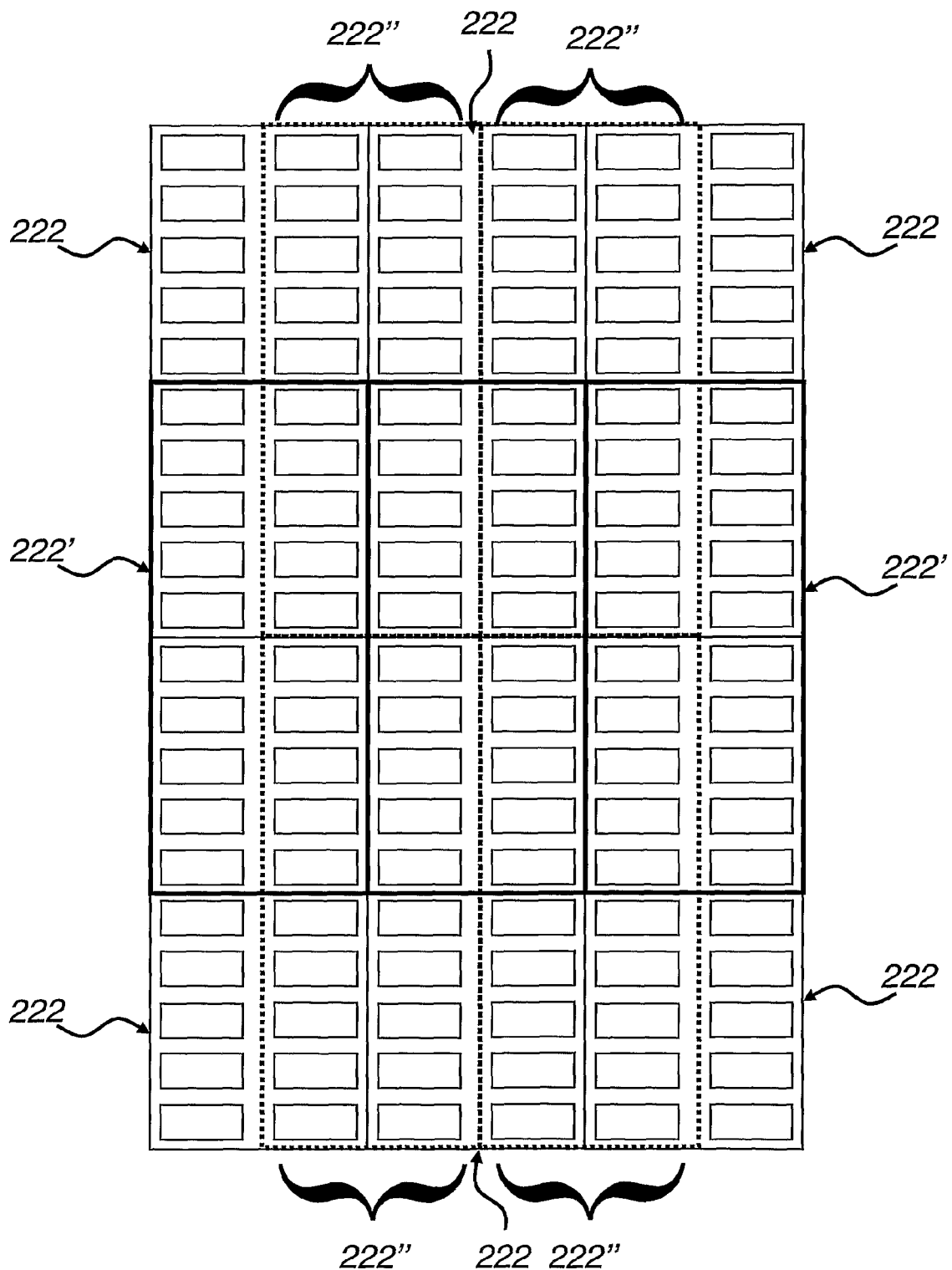
Figure 6C:
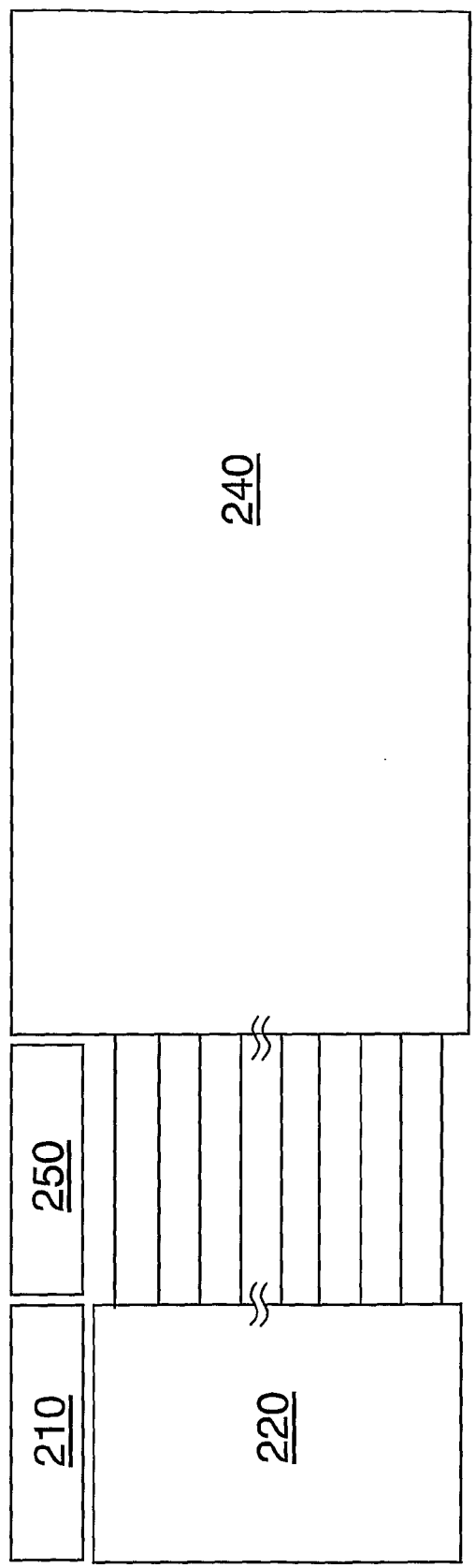
Figure 7:
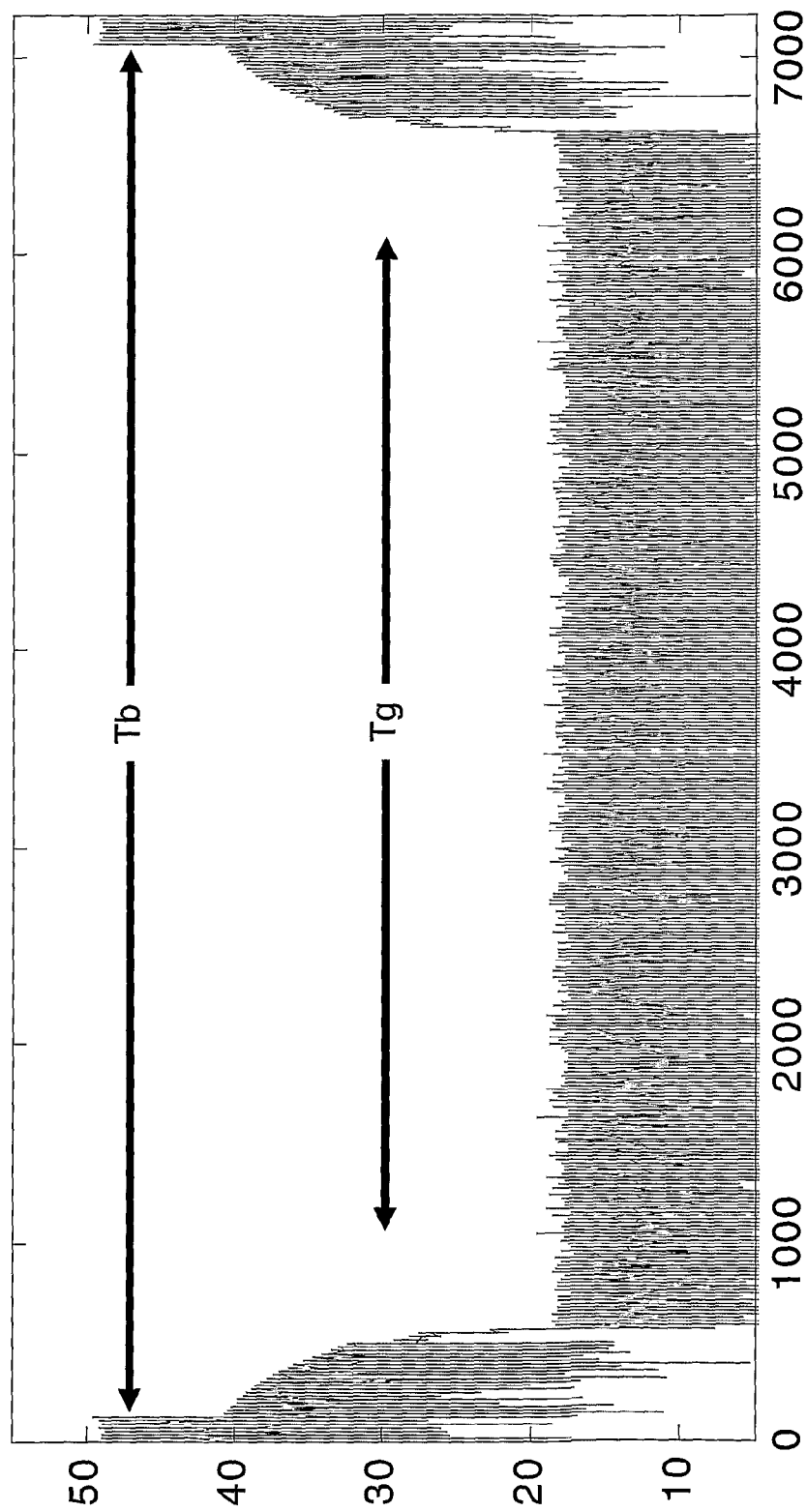
Figure 8:
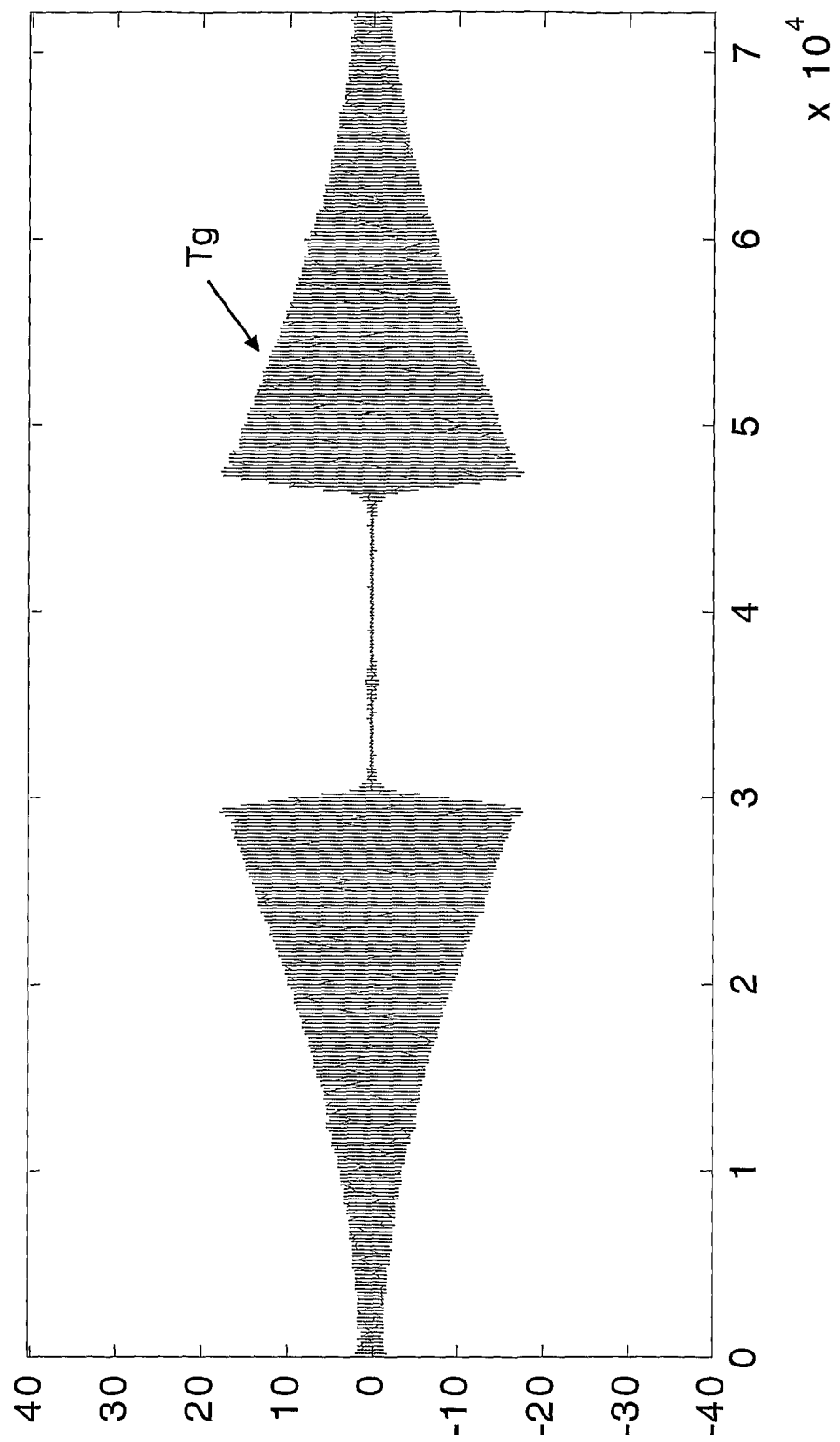
Figure 9:
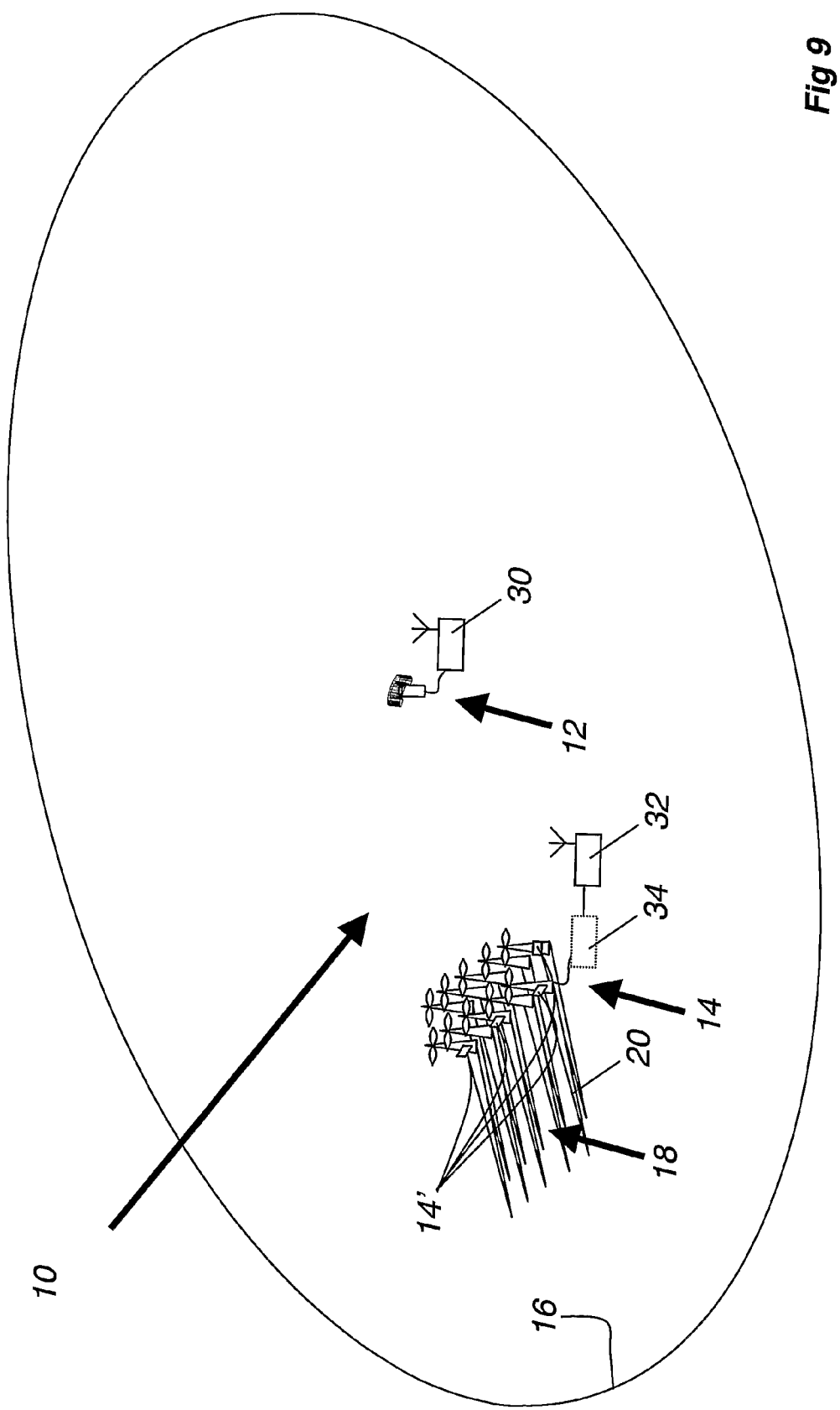
Figure 10:
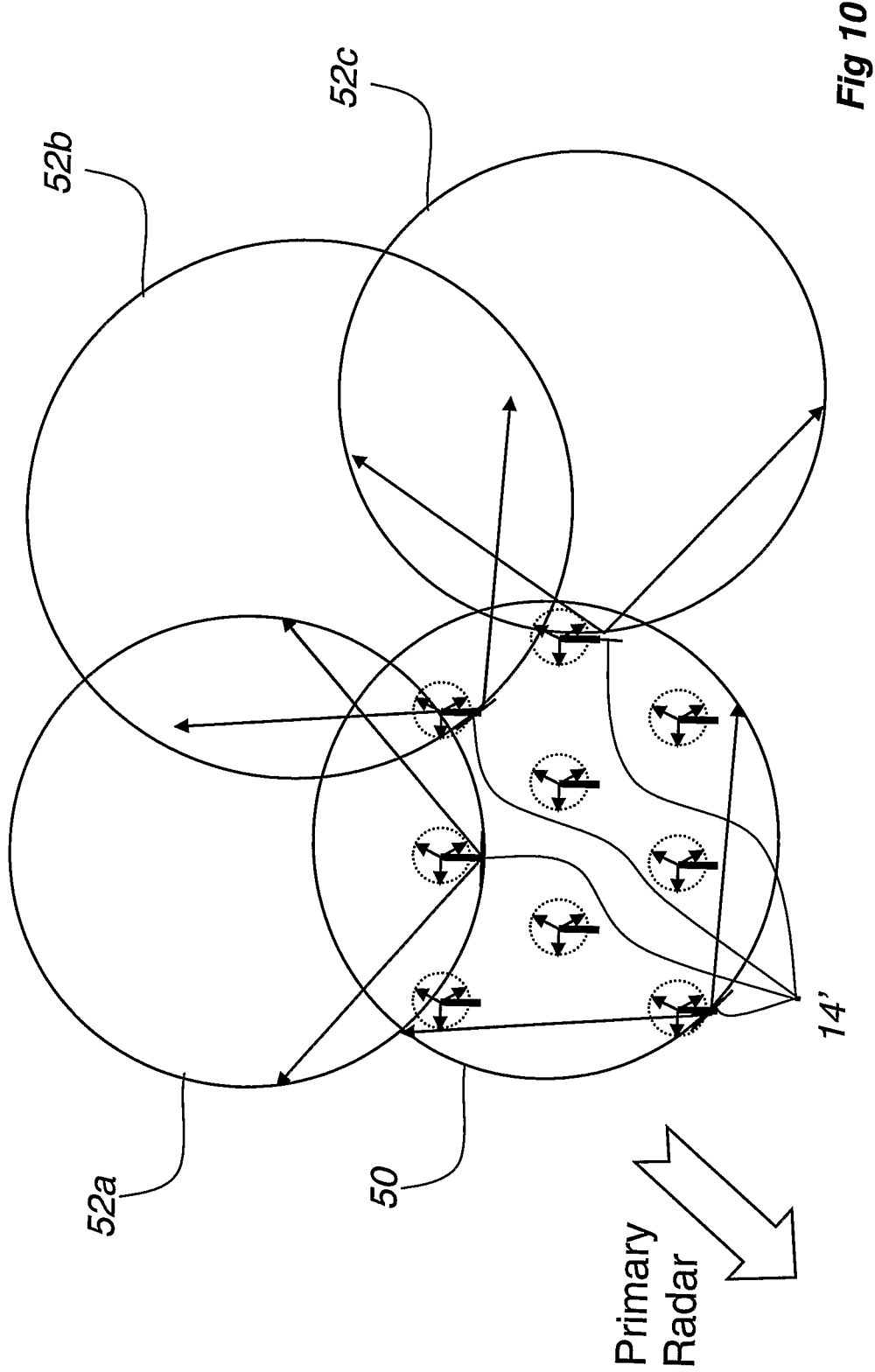
Figure 11:
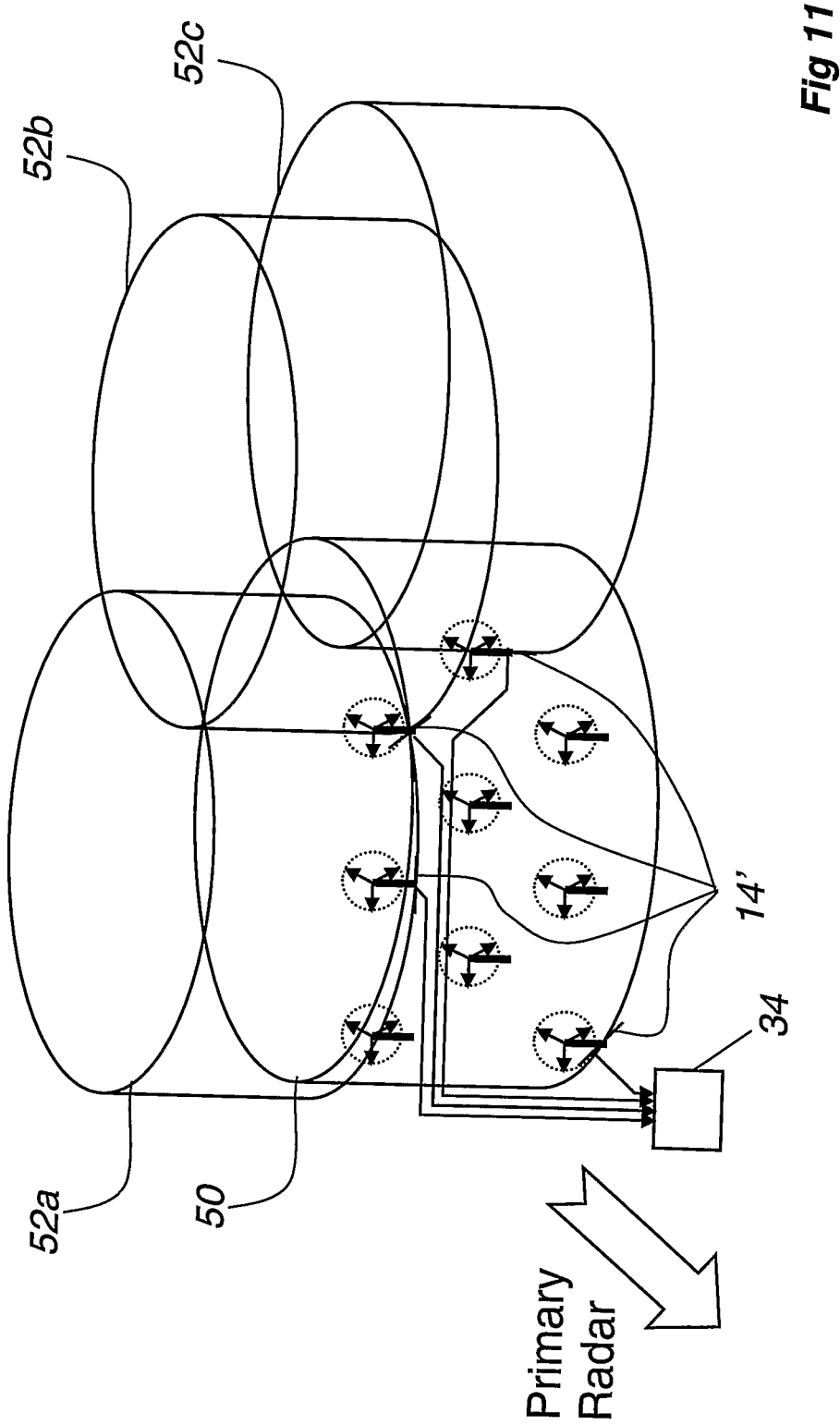
Figure 12:
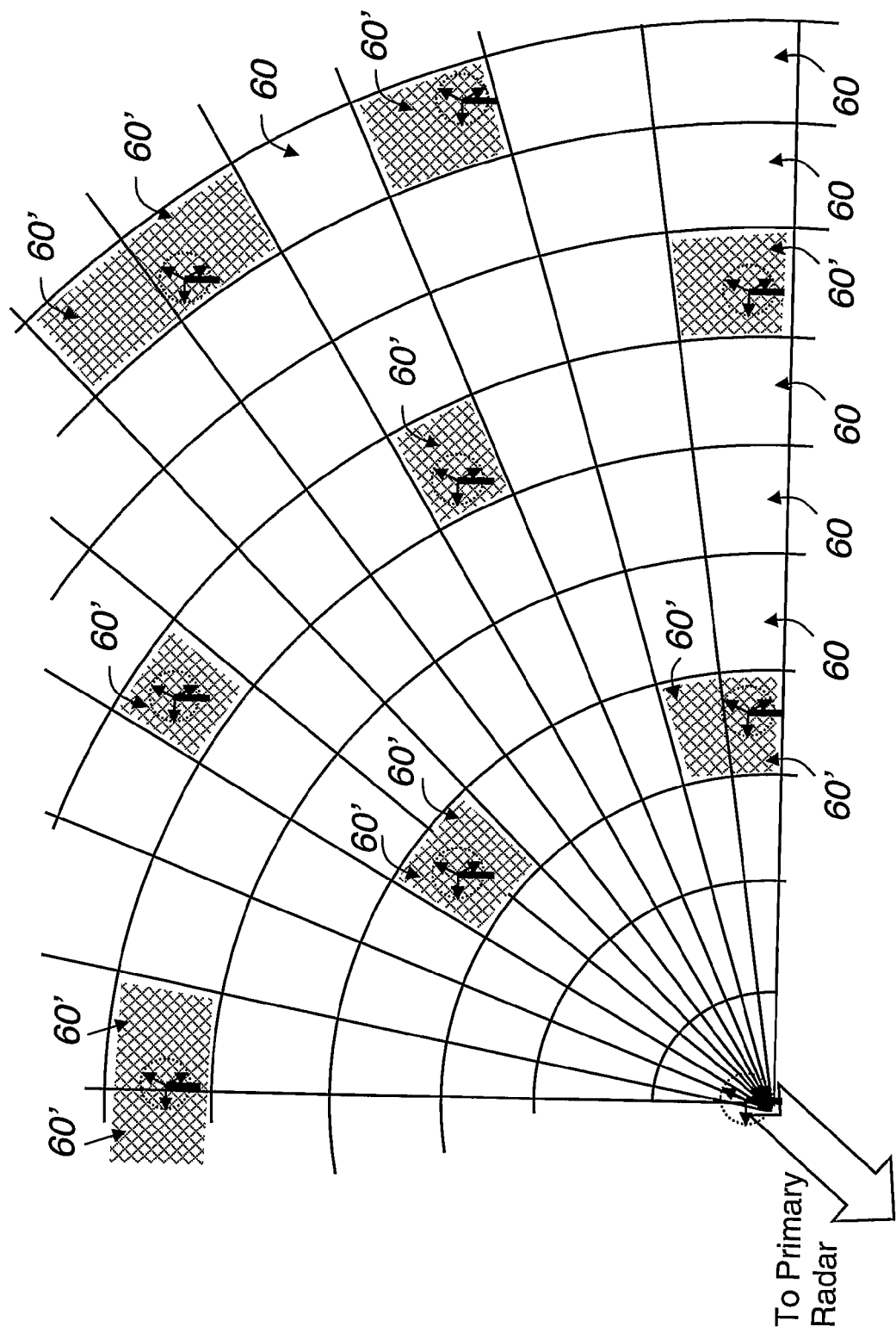
Figure 13:
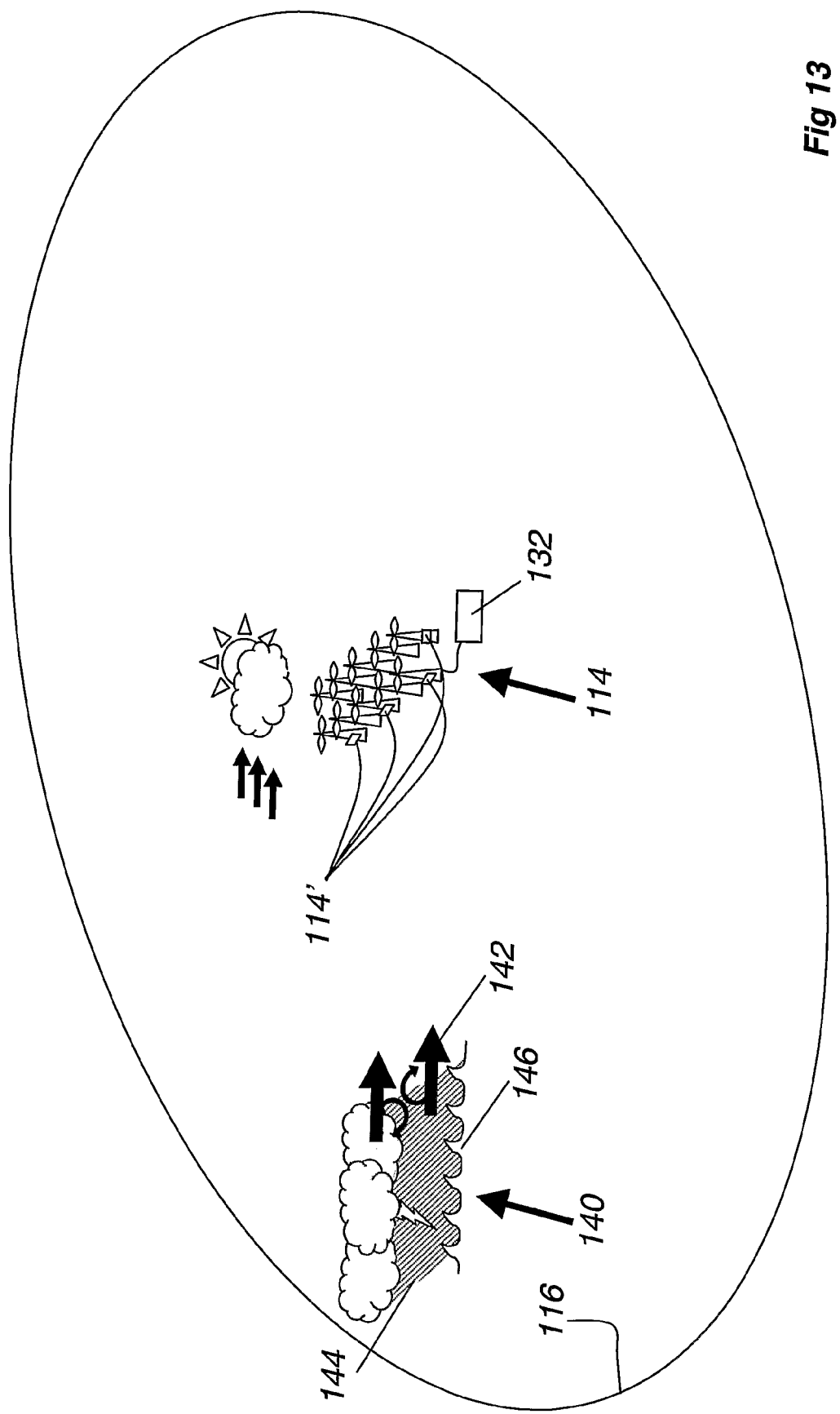
Figure 14:
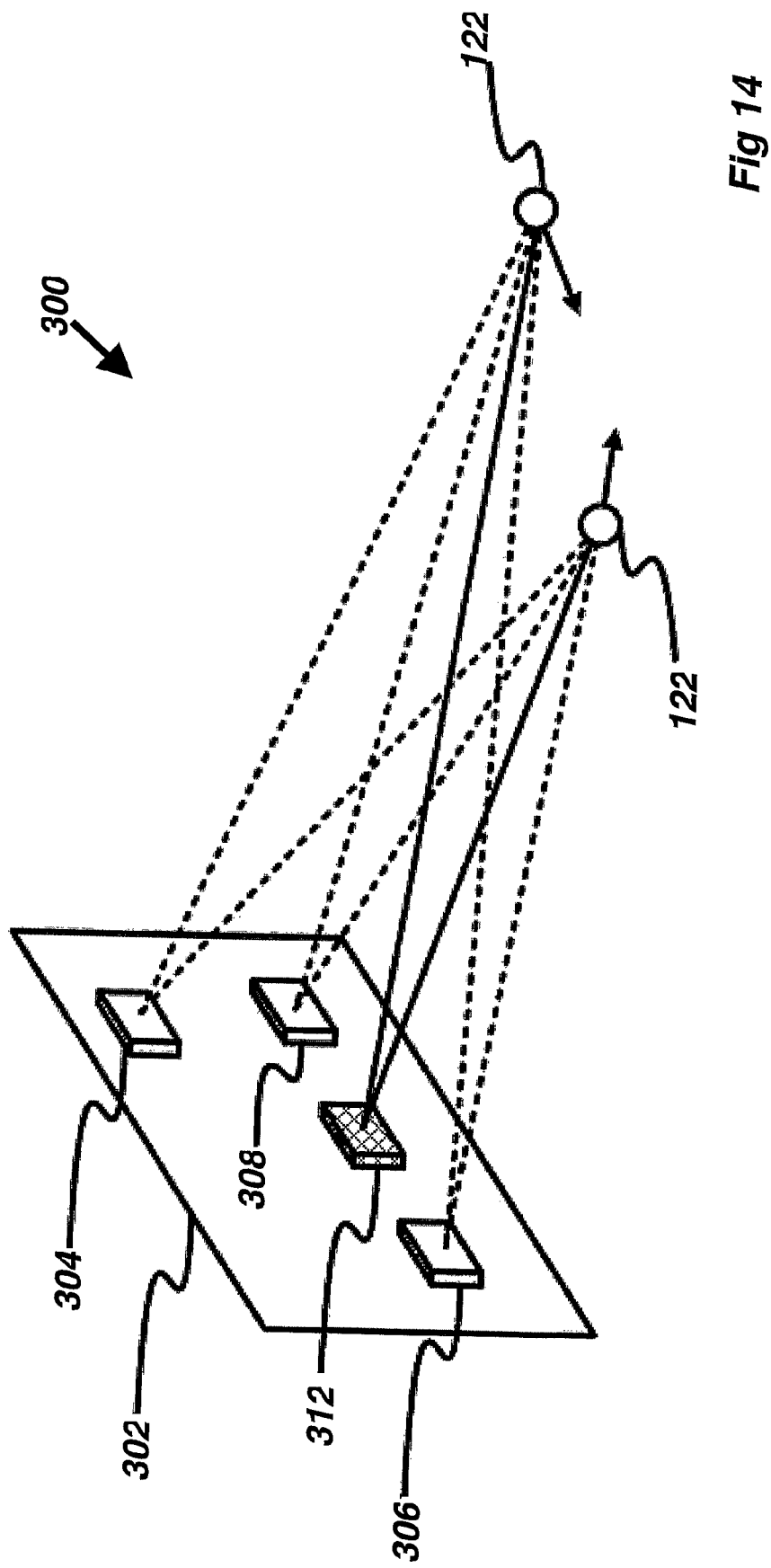

FIG. 2 shows a continuously-sampled time-domain signal for turbine blade (flashes) and a target;

FIG. 3 shows a chopped signal from a target and turbine;

FIG. 4 shows a spectrum of the chopped signal aliased across the entire band;

FIG. 5 shows a chopped signal after filtering;

FIGS. 6a to 6c illustrate an embodiment of holographic radar;

FIG. 7 shows a high-resolution (holographic) spectrum of a target and turbine;

FIG. 8 shows a target signal recovered by filtering from the holographic spectrum;

FIG. 9 shows an example of an enhanced radar system including an embodiment of holographic radar;

FIG. 10 shows a possible arrangement for the enhanced radar system according to FIG. 9 and the associated azimuth field of views;

FIG. 11 shows the radar system arrangement of FIG. 10 and an associated field of views;

FIG. 12 illustrates the use of the radar system of FIG. 9 to discriminate against wind turbines;

FIG. 13 shows another example of an enhanced radar system including an embodiment of holographic radar; and FIG. 14 shows a simple static sensor array suitable for use in the radar system of FIGS. 9 and 13.

DETAILED DESCRIPTION

In air traffic control (ATC) and air defence radar systems and the like the radar transmitter typically scans a volume of interest (either mechanically or electronically). Thus, in scanned radar systems, targets are illuminated successively as a transmitter beam sweeps or switches its position. This has the effect of 'chopping' the received signal from any target into a number of short sequences, with the result (inherent in Fourier-domain signal theory) that changes in target position between illuminations result in aliasing of Doppler returns, and that complex tracking methods are required in any attempt to discriminate between clutter and targets.

FIG. 1(a) shows a field of view for a scanning type radar. The scanning radar has a relatively narrow field of view and has to be swept to allow a large volume of interest to be illuminated, piecewise, in a sequential manner thereby effectively 'chopping' the signals received from the volume of interest at a rate determined by the sweep frequency.

FIGS. 2 to 5 illustrate the effect of 'chopping' the return signals from turbine blades (Tb) and targets (Tg).

In FIG. 2 a continuously-sampled time-domain signal is shown in which turbine blade (Tb) (flashes) and target (Tg) characteristics are both exhibited. As seen in FIG. 2 movement of the turbine blades (Tb) is characterised by six short high amplitude 'flashes' (typically associated with a three blade turbine) which, in the example, are very large compared with the target signal. The target, on the other hand, is characterised by a slow-varying signal which increases and decreases in amplitude as the target approaches and recedes respectively.

FIG. 3 illustrates the 'chopping' effect typical of scanning radar systems for the signal shown in FIG. 2 and FIG. 4 shows a high resolution frequency spectrum for the chopped signal of FIG. 3. The chopping of the signal effectively represents a significant loss of information about what is occurring in the volume of interest, which makes discrimination between target (Tg) effects and turbine (Tb) effects difficult, if not impossible.

As seen in FIG. 4, for example, the chopping of the signal causes aliasing across the entire band. Hence, target (Tg) effects and turbine (Tb) effects cannot be resolved effectively using filtering, and the removal of the effects of the wind turbine becomes virtually impossible. This is illustrated in FIG. 5, which shows the chopped signal of FIG. 3 after filtering, and demonstrates the ineffectiveness of the filtering to remove high-frequency effects associated with the wind turbine. As seen in FIG. 5, the effects of the wind turbine are still very evident.

In preferred embodiments, a static so-called 'holographic' radar is used which is based on the hypothesis that information on the spatial distribution of objects contained in a particular volume of space can be represented by electromagnetic illumination from and reception at the boundary of that volume. In broad terms, therefore, three dimensional data within a particular three dimensional volume of space can be represented by two dimensional data at its boundary in accordance with the holographic principle.

FIG. 1(b) shows a field of view of a simplified embodiment of the so called holographic radar the principles of which are described below in more detail with reference to other embodiments. Unlike the scanning radar, the holographic radar of FIG. 1(b) is static, having a relatively large field of view (~90° or greater) allowing a similar volume to be illuminated persistently. The radar of FIG. 1(b) has a centrally located transmitter 2 having an associated wide transmitter beam 2a and a plurality of receivers 4 each having an associated receiver beam (4a to 4f).

The holographic radar is configured to illuminate a particular volume of space persistently rather than in the discontinuous manner of scanning radar systems. Thus, information contained in signals returned from the volume being illuminated is not lost as a result of such discontinuity.

All beamforming and direction measurement in the holographic radar is performed after reception of return signals reflected from within the volume being illuminated, which effectively allows aliasing effects to be avoided because above-Nyquist sampling is always available, subject to a digitally-controlled multiple beamforming strategy, and to certain limits on the combined range, target speed and operating frequency, known herein as the holographic limit. The holographic limit is defined broadly as the boundary of the inter-dependent limits of range, range rate and operating frequency for which unambiguous operation of holographic radar can be achieved. The holographic limit may be expressed mathematically as a bound for which the product of maximum range (R) and the magnitude of the maximum range rate (dR/dt) must be less than the square of the speed of light (c) divided by eight times the operating frequency ($F_{op}$):

$$\left(\left|\frac{dR}{dt}\right|(\max) \times R(\max)\right) \leq \frac{c^2}{(8 \times F_{op})}$$

Thus, the use of such a radar also allows the same returns to be analysed in different ways (for example by the formation multiple beams; some to detect airborne targets without interference from sea clutter; others to assess the sea clutter and surface targets) to extract information of relevance to different applications.

FIGS. 2, 7 and 8 illustrate further advantages of using the holographic radar. The holographic radar effectively reproduces the continuously-sampled time-domain signal shown in FIG. 2 without the loss of information inherent to scanning radar systems.

In FIG. 7 for example a high-resolution (holographic) spectrum is shown for the target (Tg) and turbine (Tb) of FIG. 2. Unlike the characteristics exhibited in FIG. 4, however, the turbine spectrum is confined near the upper and lower limits with no artifacts at other locations. Thus, as illustrated in FIG. 8, the target signal may be effectively recovered by filtering from the holographic spectrum.

Holographic Radar Implementation

FIGS. 6a to 6c illustrate an exemplary embodiment of 'holographic' radar generally at 200. The holographic radar 200 comprises at least one array 210 of transmitting elements 214 configured to illuminate a whole volume of interest simultaneously, with a coherent signal modulated appropriately (for example as a regular sequence of pulses) to permit range resolution. It will be appreciated that although an array of elements is described the transmitter may comprise a single transmitting element.

The radar includes a control module 250 configured for controlling the signals transmitted via the transmitter array 210 in dependence on the nature of the application for which the holographic radar is to be used.

The holographic radar also includes a receiving array 220 comprising a plurality of receiving sub-arrays 222. Each sub-array 222 comprises a plurality of receiving elements 224 configured over an area. Each element 224 and sub-array 222 of the receiving array is arranged to receive signals returned from substantially the whole of the illuminated volume, each element 224 and/or sub-array 222 essentially forming a signal channel. The receiving array 220 contains more elements than the transmitter array 210 and has a substantially larger total aperture.

As seen in FIG. 6a the transmitter array is ten transmitting elements 214 high by two wide. Similarly, each receiver sub-array 222 is ten receiving elements 224 high by two wide arranged to have substantially the same aperture size as the transmitter array. The sub-arrays are arranged in a grid which is two sub-arrays high by eighty wide.

The elements of the sub-arrays 222 are also configured to form further, overlapping sub-arrays 222', 222" (or 'virtual' sub-arrays) as illustrated in simplified array of sub-arrays (two high by three wide) shown in FIG. 6*b*.

As shown in FIG. 6*b* the elements of vertically adjacent sub-arrays are configured to form vertically overlapping sub-arrays 222'. Specifically, the lower five elements in each of the two columns forming each upper sub-array, and the upper five elements in each of the two columns forming each lower sub-array, form a vertically overlapping sub-array 222' which shares some receiving elements with both the associated upper and lower sub-arrays.

The elements of horizontally adjacent sub-arrays are similarly configured to form horizontally overlapping sub-arrays 222". Specifically, for each pair of horizontally adjacent sub-arrays, the elements of the rightmost column of the left sub-array, and the elements of the leftmost column of the right sub-array, form a horizontally overlapping sub-array 222" which shares some receiving elements with both the sub-arrays of the associated horizontally adjacent pair.

In the case of the receiver array shown in FIG. 6*a*, therefore, the receiving elements 224 and sub-arrays 222 are arranged in a spaced relationship, facing substantially the same direction, to form an overall aperture comprising eighty-two non-coincident, but overlapping sub-apertures in width and three non-coincident, but overlapping sub-apertures in height.

It will be appreciated that although specific array and sub-array dimensions are described, any appropriate arrangement of sub-arrays and receiving/transmitting elements may be used depending on the requirements of the application for which they are used. This includes, for example, arrangements having different sub-aperture overlaps (or no overlaps), different aperture dimensions, arrays which are wider than they are tall etc.

Whilst the receiving array 220 (and sub-arrays 222) shown in FIG. 6*a* are planar, it will be appreciated that they may be conformal to some other known shape. It will be further appreciated that each transmitting array 210 (or element 214) may form part of the receiver array (or possibly a receiver sub-array).

The radar comprises a signal processing module 240 (such as a computer processor or the like) configured such that signals which are coherent with the transmitted signal may be introduced and used to determine the amplitude, frequency, delay and phase of all signals received at each element or sub-array. The processor module is also configured for the formation of multiple beams by combination of different signal channels with suitable amplitude and phase weightings. The processing module 240 is configured for performing the signal processing tasks required by the application for which the holographic radar is to be used, for example, beamforming, range gating, Doppler processing, low threshold detection, target tracking (e.g. XYZ, Vxyz, A/Phi(m, n, t)), imaging and/or classification.

The processing module 240 and the control module 250 may form part of the same processing apparatus configured to control radar signals transmitted by the transmitter array and to process return signals received by the receiving array.

The arrangement of sub-arrays 222 and receiving elements 220 allows multiple (overlapping) beams to be formed (e.g. one for each of the different sub-arrays 222), by the processor, which have substantially the same look direction, thereby permitting monopulse sub-beam angular measurement. The use of a plurality of sub-arrays 222 permits greater measurement accuracy than phase monopulse angular measurement using, for example, a single array of closely spaced receiver elements.

It will be appreciated that although phase monopulse angular measurement is described, the receiver elements and/or receiver sub-arrays may be arranged to allow amplitude monopulse angular measurement.

It will be further appreciated that a plurality of sub-arrays may also be arranged having different look directions, effectively creating a plurality of separate apertures/sub-apertures. The sub-arrays may be arranged, for example, to provide a wider (for example) 360° coverage. Similarly, the sub-arrays may be arranged to look at a known man made or other obstacle from (slightly) different locations thereby allowing targets which would otherwise be obscured by the obstacle to be resolved with greater accuracy. If, for example, the radar is located at a wind farm the receiver sub-arrays may be arranged to 'look around' turbines which otherwise obscure part of their individual fields of view.

Thus, whilst beamforming on transmission is a process with a single, physically-exclusive outcome, on reception as many beams can be formed as the configuration of the receiver array and the available processing resources can support. Hence, whereas transmission beams must be directed sequentially, receiving beams may be formed simultaneously.

All targets in the illuminated volume may therefore be illuminated at a rate (for example a pulse rate) sufficient to exceed the Nyquist limit for Doppler shifts associated with all targets, subject to the holographic limit.

In this way the signals from all targets are fully sampled, information loss is minimised, and alias effects are avoided, resulting in the ability to: perform precision tracking and coherent tracking; reconstruct imagery; characterize behaviour; classify targets etc. Tracked targets are represented in computer memory not only in terms of XYZ and Vxyz as a function of time, but also in terms of the Doppler phase and amplitude history of the target.

Signals received by the subarrays may simultaneously be combined in a first data stream such that the amplitude and phase weightings provide a null in the direction of the land or sea surface, to reject surface targets, and in a second data stream such that the amplitude and phase weightings provide a null in the direction of raised objects such as wind turbines, allowing the observation of surface targets and rejection of turbines or aircraft. Separate filtering and tracking algorithms can then be applied to the two or more data streams.

The received return signals effectively represent observations (which may or may not represent a target of interest) made by the radar in each of a plurality of signal channels. In the radar, data extracted by the processor for each observation is stored in process 'pixels'. Each pixel may be considered to be a unique set of numbers representing, for example, a single combination of time, range, range rate and/or Doppler frequency, and at least one of beam number, sub-array number, and/or element number.

The pixel content comprises a list of numbers representing, for example, a series of amplitudes, phases and/or frequencies representing the characteristics of the associated observation, which may constitute a target, an item of clutter, or a 'null', whose behaviour may be deemed insignificant. Observations are deemed significant until they are reliably known to be insignificant and a history of the information (e.g. phase histories, amplitude histories, or the like) extracted from the observations is retained. This approach contrasts with the process of thresholding in which observations are deemed insignificant and discarded, without further processing, unless a particular parameter (or set of parameters) meets an associated threshold (or set of thresholds).

In a cluttered environment typified by a wind farm, therefore, the radar functions to form the best tracks possible for all targets, based on amplitude and phase histories, and to discriminate between significant and insignificant targets (or targets representing one class or another) at the end of the analysis rather than at the beginning. Coherent analytical processes can be applied to enhance or minimize targets of different types, since all signal information is retained within the signal and target memories.

Such a radar may be limited in its maximum range, either by intent, by limiting the delays at which signals can be received, or by default, when power, unambiguous range or Doppler coverage are too small, and should fall within the holographic limit. Such a limited-range sensor provides a natural basis for an 'in-fill' radar within a larger field covered by a standard air traffic control, air defence, marine radar or the like.

Thus, the configuration of the radar is such that, being holographic in its mode of operation, as described, it is capable of accommodating and discriminating targets and clutter in a densely populated environment.

Application as In-Fill Radar

In FIG. 9 a first application of holographic radar within an overall radar service is shown generally at 10. The radar service 10 comprises a primary radar transmitter/receiver 12 and a secondary radar transmitter/receiver 14. The radar system 10 is configured for scanning a surveillance area 16 which includes a wind farm, another large group of structures, or the like, which causes interference to transmitted and reflected radar signals thereby resulting in a region 18 of reduced radar performance and hence a degraded detection capability (for example as a result of shadowing 20, modulation effects, cascading reflections, or the like).

The primary transmitter/receiver 12 comprises the main transmitter/receiver of an existing or new radar system (for example the transmitter/receiver antenna(s) of an existing air traffic control system or the like).

The secondary transmitter/receiver 14 forms part of a holographic radar system, generally as described previously, in which the information on targets contained in a particular volume of space illuminated by the radar can be represented by information within the radar signals returned from within that region. The secondary transmitter/receiver 14 comprises an array of radar sensors 14' provided at appropriate locations for illuminating the region(s) of reduced radar performance. Each radar sensor 14' is mounted at the wind farm, for example attached to the tower of an appropriately located wind turbine. Alternatively or additionally one or more of the radar sensors may be located away from the wind farm to create a desired detection field for the secondary transmitter/receiver 14. It will be appreciated that whilst use of an array of sensors is advantageous a single radar sensor may be used in certain applications. The radar sensors may be located facing different directions from the wind farm and a plurality of such sensors may be arranged at different orientations around a wind turbine to give a wider angle of coverage.

As described previously, each radar sensor 14' comprises a static sensor as opposed to a rotating antenna, which might cause mechanical interference with the turbines. Furthermore static sensors are easier to install and are less susceptible to the harsh environment to be expected at a wind farm especially those sited offshore and subject to severe weather conditions.

The static sensors advantageously comprise arrays of transmitting and receiving elements (antennas) as generally described with reference to FIG. 6. It will be appreciated however, that in another arrangement, the system may comprise a much simpler radar sensor one possible example of which is described in more detail below with reference to FIG. 13. The ability of the sensor to provide data for determining the position of targets is provided for by the relative location of the different receiving elements (and/or sub-arrays of receiving elements). This allows calculation of phase relationships or delays between signals received at the different elements (or combinations of elements) of the receiving array and hence calculation and tracking of position.

Each radar sensor has a wide field of view (typically extending ~20 km) and can measure directions in both azimuth (typically ~90° or greater) and elevation (typically ~20°. Wider angle (for example 360 degree) coverage is provided by installing a plurality of antenna arrays (or sub-arrays), pointed appropriately, or by one or more non-planar arrays. These may be positioned separately, may be located at different positions around the perimeter of a turbine support shaft, or may be attached to different turbine supports.

A plurality of sensors 14' may also be provided which have the same look direction but effectively having non-coincident overlapping sub-apertures as described previously. This allows multiple beams to be formed with the same look direction from the different sub-arrays and hence permits monopulse sub-beam angular measurement of greater accuracy.

A possible arrangement of radar sensors 14' is shown in FIGS. 10 and 11. The arrangement comprises four sensors; a first of which illuminates a first region 50 comprising the wind farm itself (or a part thereof); and the remaining three of which together illuminate a further region (comprising smaller regions 52a, 52b, 52c) extending away from and beyond the wind farm (relative to the primary transmitter/receiver). The first sensor is configured such that the first region 50 extends not only in the general direction of the wind turbines but also extends to cover an area above them. Thus, the first sensor persistently illuminates the turbines allowing them to be continuously sampled and Doppler resolved. Coherent tracking by the processing apparatus allows turbine and target returns to be resolved in either range or Doppler.

Each sensor is located relatively low on an associated turbine tower and may be provided with an upward bias to cover a cylinder of obscuration in three dimensions as illustrated in FIG. 11.

Radar return signals received by the primary transmitter/receiver are processed by appropriate processing apparatus 30/32 typically at the location of the primary transmitter/receiver (e.g. the air traffic control tower or the like) or distributed between a remote processing capability 30 at the location of the primary transmitter/receiver and a local processing capability 32 at the wind farm. The processing apparatus may of course be located exclusively at the wind farm itself. The processing apparatus analyses the return signals to detect and track objects of interest as they traverse a surveillance area (detection field) of the primary transmitter/receiver into/out of the region of reduced radar performance.

As seen in FIG. 12 the volume or region of interest may be sub-divided using appropriate beam forming an range gating into sub-regions 60, some of which 60' are occupied by wind turbines (or are at least affected by their presence). The subdivision of the volume of interest allows turbine rejection to be applied selectively, thereby minimising the possibility of false rejections.

A typical procedure followed by the processing apparatus 30/32 for turbine rejection (e.g. for signals received by the sensor array associated with region 50) will now be described by way of example only. Typically the processing apparatus treats the holographic system as linear and begins by forming beams for the different sub-arrays including beams covering the turbines in the illuminated volume (Beam 1, 2, 3 . . . n(turbine(1)) . . . ). Range gates are then formed including range gates for the illuminated turbines (RG 1, 2, 3 . . . m(turbine(1)) . . . ). A Fast Fourier Transform (FFT) is applied to each range gate/beam product (RG×Beam) and a high pass Doppler filter is applied to the resulting FFT for each range gate/beam product associated with a turbine (RG(m)×Beam (n) . . . RG(p)×Beam(q)). A coherent tracking algorithm (to track phase across the range bins) may then be applied.

In this manner returns from turbines can be effectively rejected. False alarm detections are severely restricted and residual dropouts are limited to slow passes within the range gate and beam.

Radar return signals received by the secondary transmitter/receiver (which are less affected by the presence of the interfering structures due to the absence of Doppler aliasing) are appropriately analysed and integrated with data from the primary transmitter/receiver by the processing apparatus to enhance detection and/or tracking of the object of interest whilst it traverses the region of reduced radar performance.

Data representing targets detected by the secondary radar sensors are communicated from the secondary transmitter/receiver to the processing apparatus by suitable communication apparatus 32 for subsequent integration with data generated by other radar sensors. Typically, for example, the communication apparatus are configured for wireless communication between the secondary transmitter/receiver and the processing apparatus.

It will be appreciated that the secondary transmitter/receiver may alternatively or additionally be provided with a dedicated processing capability 34 for carrying out preliminary analysis on the signals received by the secondary radar sensors 14' before subsequent transmission to the processing apparatus for further processing of the signals and integration with data from other sensors. For example, tracks of potential targets of interest may be filtered prior to transmission for processing by the processing apparatus at the primary transmitter/receiver which is particularly useful for air traffic control systems. Alternatively (or additionally) the raw data may be transmitted for processing by the processing apparatus at the primary receiver/transmitter (e.g. for air defence systems).

It will be appreciated that the arrangement of the system allows target tracks to be extracted by the processing apparatus in parallel if required.

Typically the sensor has dimensions of the order of a few meters high by a few meters wide, for example, ~6 m high by 3 m wide. The sensor is typically mounted on a turbine at a height of between 5 m and 25 m above ground/high water level, for example, ~15 m above. The sensors are typically mounted with an upward bias of a few degrees, for example ~10°. Alternatively the sensor may be mechanically vertical but the beams electronically steered with an upward bias. It will be appreciated that these examples are purely illustrative and that there may be significant variation in the most suitable implementation used for any particular application.

The processing apparatus is also configured for defining a detection zone for the secondary transmitter/receiver, within the normal detection field of that transmitter/receiver, outside which the secondary transmitter/receiver does not report objects of interest. The detection zone is defined to be generally coincident with the region of reduced radar performance thereby avoiding unnecessary duplication of processing activity (for example, by limiting processing of signals from the secondary receivers to times when enhancement is required). The processing apparatus may be configured to define separate detection zones for each radar sensor of the secondary transmitter/receiver which may overlap or may comprise distinct non-overlapping regions. Definition of detection zones is described in more detail below.

Application in Pre-emptive Environmental Condition Detection

A further application of such a radar is illustrated in FIG. 13 which shows a radar system 110 in which pre-emptive measurement of wind field can be made in preparation for wind energy generation or in real time as wind eddies or the like approach a wind farm or individual wind turbine. In this case precipitation, eddies and turbulence in the wind cause the scattering of radar signals that can be detected, leading to imagery of the wind field itself.

The radar system 110 comprises a transmitter/receiver array 114' located at a wind farm generally as described previously with the transmitter element(s)/array(s) arranged for illuminating a region 116 of interest either around the wind farm as shown or in a particular direction of interest.

The system 110 includes processing apparatus 132 configured for processing signals returned from within the illuminated volume to extract indicators of prevailing environmental conditions 140 within the volume at some distance from the wind farm. These indicators are analysed by the processing apparatus and the relevance of the environmental conditions 140 which they signify, to the wind farm, is determined. The processing apparatus determines appropriate (optimal) operating parameters for the wind farm (or one or more individual turbines) based on this analysis and outputs the parameters for use in controlling the wind turbines. The output may include timing data to indicate a time at which the current operating parameters of the wind farm should be modified based on a prediction of when the environmental conditions of interest will reach the turbines.

The processing apparatus may, for example, determine that specific environmental conditions 140 are approaching a wind-farm from somewhere in the illuminated volume and that the conditions are of a type (such as changes in the characteristics of the wind) relevant to the wind farm's operation (e.g. its efficiency, its generation capability, its robustness and safety, or the like). Hence, based on this analysis, the processing apparatus provides wind (or other environmental) parameters appropriate to determine operating parameters of the wind farm (or one or more individual turbines) for when the approaching environmental conditions arrive.

The radar system 110 may comprise a controller for adjusting the operating parameters of the wind farm, individual turbines, and/or individual turbine components (e.g. blades) or may be configured for compatibility with an existing controller at the wind farm. Accordingly, the processing apparatus is configured for outputting operating parameters in a suitable format for interpretation by the controller. It will be appreciated that whilst automatic control of the turbines in response to predictions of changing environmental conditions is desirable, the output from the processing apparatus may include visual or audible signals for interpretation and implementation by an operator of the wind farm.

The operating parameters may comprise any modifiable attribute of the wind farm including, for example, the angle which a turbine faces, the pitch of each blade, the status of each blade (e.g. feathered or operational), the status of each turbine (e.g. operational or shut-down), and/or the like.

The environmental conditions may comprise any radar detectable conditions including, for example, wind characteristics 142 (e.g. wind speed, wind shear, turbulent eddies, or the like), precipitation/air borne moisture characteristics 144 (e.g. density, type, etc.), and/or any surface effects 146 (such as wave formations for off-shore facilities).

The mean air flow past a wind turbine affects the available energy, according to a substantially cubic dependence. However the efficiency and safety of a wind turbine is related to variations in the wind speed. A high wind speed near the top of the turbine (assuming a horizontal spin axis), and a lower wind speed closer to the surface (whether the ground or the surface of the sea) can lead to inefficiency given that the upper and lower blades move at the same speed. This can be mitigated by modifying the pitch of the blades during rotation between upper and lower positions. Hence, the processing apparatus is configured to take account not only of the overall environmental conditions in the region of interest (for example average wind speed) but also to take account of localised differences (for example stratified wind speeds, and/or those resulting from turbulence) in the weather patterns.

When a turbulent burst impinges on the turbine the blades may be affected in such a way that stresses build up in directions that can not be accommodated by circular motion of the airfoil. This may represent a hazard to the turbine or its surroundings, and could result in its destruction. In that case it may be beneficial to 'feather' the blades, or otherwise modify their pitch in time, which may be possible if some seconds' advance warning of the burst is available.

The indicators of the environmental conditions may be associated with any environmental features which cause radar reflections. For example, when air moves across the land or sea surface, wind shear and turbulent eddies are generated. Hence, the flow of precipitation (or suspended moisture) in the air is also modified by the air motion. As the density of air or windborne precipitation (or suspended moisture) varies, radar signals propagating through the air are scattered or reflected and may be received by a radar receiver. These signals may be detected and interpreted in terms of the air flow using the principles outlined above.

Whilst scattering in such environments is weak and occurs in the presence of larger, unwanted targets such as land or sea clutter, holographic radar as described may achieve the necessary sensitivity by sufficient coherent integration of scattered signals, and may be used to discriminate between the wind motion and the surface clutter in either case. Wind flow, for example, tends to be vertically stratified, and reflections at different layers may be resolved either by vertical receiver beamforming or by observing their different Doppler frequencies and measuring their phases across the receiving array.

Holographic radar located near a wind generation system can therefore allow wind patterns to be measured beneficially, either to assess the potential wind energy resource, or to enable improved control and safety of one or more installed wind turbines.

In a further environmental application of the holographic radar, the radar's vertical beam pattern may be digitally re-formed to achieve a high sensitivity in the plane of the sea surface, rather than the minimum sensitivity required in the case of wind imaging against sea clutter. In this case the signals generated by waves are observed rather than rejected, and the holographic radar may then be used as a wave sensor.

In each application, the fact that data from all observations is retained and processed, rather than discarded according to specific thresholds, means that the applications can be implemented in parallel with the processing apparatus configured to analyse the stored wind farm associated data purposively in dependence on the requirements of the specific application. For example, information on environmental conditions may be considered irrelevant to the augmentation or 'in-fill' application and so may be ignored for the purposes of improving the detection capability of an air traffic control, air defence and/or marine radar system. Contrastingly, for the purposes of ensuring optimum operating conditions at the wind farm, this same environmental information may be extracted and analysed whilst information on moving objects such as aircraft, ships, or the like is ignored.

Antenna Arrays

With reference to FIG. 14, there is shown a diagrammatic representation of a planar antenna array 300 suitable for use as a static sensor or the like in an embodiment of this invention.

The antenna array 300 is constructed on a (preferably insulative) substrate 302. The substrate may be a block of plastic or glassfibre composite material (or similar) having a flat supporting surface. In order that embodiments of the invention are available for use where space is restricted, the antenna array is compact, having a peripheral size depending on the arrangement of antenna. For example, the array may comprise an offset transmitter antenna and a trapezoidal/triangular receiver array, with the transmitter element comprising a four by two sub-array and each receiver element comprising a two by two sub-array. Alternatively the array may be arranged with a central transmitter and four peripheral receivers. Antenna elements are formed on the supporting surface of the substrate as conductors printed onto the surface. The antenna elements may be dipoles (for example, bow-tie dipoles), TEM horns, microstrip patches, stacked patches, or any other compact element or conductive structure suitable for operating at the required signal frequency. Such an antenna is described in WO01/059473; and is generally best suited for short range applications in which high sensitivity is less important and in which fewer targets are expected within the detection field.

For applications requiring higher sensitivity and the ability to resolve more targets a higher-power transmitter array and a larger receiver array may be required, each of whose sub-arrays has the same field of view as the transmitter array.

It will be appreciated that the elements/sub-arrays may not be mounted on a common substrate for mechanical robustness. In such an arrangement however, the elements/sub-arrays may still be mounted in a common plane.

In the example of FIG. 14, the array 300 has four antenna elements in total. Three of these elements are first, second, and third receiving elements 304, 306, 308 although other numbers of receiving elements, such as two, three, five or more, may be provided. The fourth element is a transmitting element 312. The receiving elements 304, 306, 308 are disposed at the vertices of a triangular shaped (which may, in a special case be a right angled triangle) locus, and with more elements these could be disposed at the vertices say of a trapezoid or an irregular planar locus. In the case of a three-dimensional substrate they may be at the vertices of a cuboid or other solid form. The transmitting element 312 is disposed at the centre of the same locus.

Subject to the requirements for sensitivity and resolution the size of the antenna array is preferably kept to a minimum. For example, in this minimum case, the spacing between the elements may be in the order of no more than a few half-wavelengths. For example at an operating frequency of 6 GHz, spacings may be a few centimeters, say between 1 and 10 cm, preferably between 2 and 8 cm.

In an alternative form of construction, the antenna elements may be located within a dielectric radome. Associated signal processing circuitry may also be located within the radome in order to provide the apparatus as a self-contained package. It will be appreciated, however, that the array may comprise any suitable configuration, and where accurate positional information is not required may comprise a single receiver antenna.

Defined Detection Zone

As described above, in the case of the detection augmentation application, the processing apparatus may be configured to sub-divide the detection field of the secondary transmitter/receiver into a first zone in which detection events are considered to be significant for the purposes of enhancing radar performance (a detection zone), and a second zone in which such radar enhancement is not required. Similarly, for the purposes of environmental condition analysis the processing apparatus may be configured to sub-divide the detection field into a plurality of different zones, for example for which different types of analysis may be performed (e.g. to allow the effects of different physical surface features such as localised land (or water) masses or environmental conditions to be catered for). The sub-division may be carried out by any suitable means, typically by a software program based on combining signals from different sub-arrays with appropriate phase and amplitude weightings.

The processing apparatus may operate to execute an algorithm that defines a 3-dimensional volume of space within the detection field as the detection zone. For example, the detection zone may be defined to lie between spaced planes by specifying that it is bounded by minimum and maximum values of X, Y, and Z ordinates in a Cartesian coordinate system within the detection field of the array. Alternatively, the detection zone may have an arbitrary shape, defined by a look-up table or a mathematical formula. Thus, the detection zone can have substantially any shape that can be defined algorithmically, and can have any volume, provided that it is entirely contained within the detection field. Flexible detection zone definition such as this is particularly advantageous in defining a zone in which enhancement is required because the regions of reduced radar performance may be subject to change, for example as new wind turbines are added to existing farms or as existing turbines are switched out of operation for maintenance purposes. Similarly, in the case of environmental condition detection, the flexibility allows a zone to be set-up to track a particular environmental feature of interest (e.g. a storm, squall or microburst).

In the case of radar augmentation, the processing apparatus may be operative to detect and track entry of an object of interest into and through the detection zone and to integrate data from both the secondary and primary transmitter/receivers thereby to enhance detection within the region of reduced radar performance.

As a development of this embodiment, the processing apparatus may define a plurality of detection zones. The detection zones may be non-coextensive (overlapping, separated or spatially different) and/or alternatively defined, by which it is meant that different characteristics are used for determining whether an object (or a particular environmental condition) is in the relevant detection zones. For example, different zones may be provided for detecting different speeds or different sizes of objects. This can, for example, be used to ensure continuous tracking of objects of different sizes and/or speeds into and out of the region of reduced performance.

In another development of this embodiment, the processing apparatus is operative to analyse characteristics of objects (or prevailing environmental conditions) outside of the detection zone. Such characteristics may be, for example, size of the object, distance of the object from the apparatus and/or the detection zone, direction of movement of the object relative to the apparatus and/or the detection zone, and relative speed of the object. As an example, the processing apparatus may be operative to track objects outside the detection zone and to predict their entry into the detection zone. It will be appreciated that such functionality is equally beneficial for monitoring the movement of environmental features of interest relative to the defined detection zone(s).

A further embodiment is summarised below by way of example only.

The embodiment is directed to augmenting the function of surveillance radar systems in the presence of new structures, for example to ameliorate the effect of new structures, and in particular wind farms on air traffic control radar systems.

The embodiment comprises the combination of a suitable form of radar sensor or sensors with the method of enhancing air traffic control by mounting them at the wind farm itself for example attached to the turbines.

Each radar sensor is one that does not require a large, rotating antenna, thereby avoiding mechanical interference with the turbines. A static sensor will be easier to install and less susceptible to the harsh environment to be expected at the wind farm. Many wind farms are sited offshore and are subject to severe weather.

A preferred implementation of the radar sensor is one using static (preferably asymmetric) arrays of transmitting and receiving elements whose region of illumination is the whole field of view and whose regions of sensitivity may be selected within that field. Their ability to measure the position of targets is provided by calculation of phase relationships or delays between signals received at different elements or combinations of elements of the receiving array.

Each radar sensor has a wide field of view and can measure directions in both azimuth and elevation. 360 degree coverage is provided by installing more than two planar antenna arrays, pointed appropriately, or by one or more non-planar arrays. These may be positioned separately, may be located at different positions around the perimeter of a turbine support shaft, or may be attached to different turbine supports.

Data related to targets detected by the radar sensors are communicated preferably by a wireless or optical link to the user, the air traffic control/air defence system or systems and integrated by suitable computer software with the data generated by other radar sensors.

What is claimed is:

1. A radar system comprising:
a transmitter adapted to transmit radar signals into a region of a cluttered environment to illuminate said region with a signal modulated as a regular sequence of pulses at a given pulse rate;
a receiver adapted to receive return signals, of said radar signals, reflected from within said region, and representing observations; and
a processor adapted to process the return signals to extract data, including clutter related data, for said region, wherein said processor is operable to integrate said return signals coherently and subject to a limit on the range and range rate associated with the observations that the return signals represent, within which limit said radar operates substantially unambiguously in range and range rate at said pulse rate, and
wherein said limit on the range and range rate is expressed by the inequality:

$$\left(\left|\frac{dR}{dt}\right|(\max) \times R(\max)\right) \le \frac{c^2}{(8 \times F_{op})}$$

where R is the range and dR/dt is the range rate associated with the observation, c is the speed of light, and $F_{op}$ is operating frequency of the radar system.

2. The radar system as claimed in claim 1, wherein said transmitter has a first aperture and said receiver has a second aperture, wherein said first aperture is smaller than said second aperture.

3. The radar system as claimed in claim 2, wherein said receiver comprises a plurality of sub-arrays each of which has a sub-aperture of substantially equal size and shape to the first aperture.

4. The radar system as claimed in claim 1, wherein said transmitter comprises a static transmitter and wherein said transmitter is configured to do at least one of the following:
   persistently illuminate said region;
   persistently illuminate said region without being sequentially scanned or directed;
   form multiple receiving beams;
   illuminate said whole region with a broad beam;
   illuminate a whole volume of interest simultaneously;
   illuminate said region with a coherent signal modulated to permit range resolution; and
   illuminate targets in the region at a rate sufficient to exceed the Nyquist limit for Doppler shifts associated with the targets.

5. The radar system as claimed in claim 1, wherein said processor is configured to do at least one of the following:
   assess the significance of an observation represented by a return signal only after data relating to the observation has been extracted, stored, and analysed;
   classify a target represented by an observation only after data relating to the observation has been extracted, stored, and analysed;
   identify observations of interest from said extracted data and to store historical data for said identified observations;
   store extracted data representing an observation in process pixels each of which represents a unique set of attributes;
   store a characteristic of a return signal representing an observation in an associated pixel;
   form a plurality of beams by combining different signal channels with suitable amplitude and/or phase weightings;
   determine at least one of the amplitude, frequency, delay and phase of said return signals using a signal which is coherent with the transmitted radar signal; and
   process signals received by a plurality of sub-arrays of receiving elements in a first data stream and a second data stream in parallel.

6. The radar system as claimed in claim 1, wherein said processor is configured to identify observations of interest from said extracted data and to store historical data for said identified observations, wherein said historical data comprises phase and/or amplitude histories.

7. The radar system as claimed in claim 1, wherein said processor is configured to identify observations of interest from said extracted data and to store historical data for said identified observations, wherein said historical data comprises a Doppler history.

8. The radar system as claimed in claim 7, wherein said processor is operable to discriminate between observations representing moving clutter and other observations, based on the Doppler history.

9. The radar system as claimed in claim 7, wherein said processor is operable to discriminate between observations representing moving targets and other observations, based on the Doppler history.

10. The radar system as claimed in claim 7, wherein said processor is operable to discriminate between observations representing a surface wave, and other observations, based on the Doppler history.

11. The radar system as claimed in claim 1, wherein said processor is configured to identify observations of interest from said extracted data and to store historical data for said identified observations, wherein said processor is configured to do at least one of:
   form tracks for said targets based on processing and interpretation of said historical data;
   discriminate between significant and insignificant observations based on said historical data; and
   discriminate between targets representing one class and targets representing another class based upon said historical data.

12. The radar system as claimed in claim 1, wherein said processor is configured to store extracted data representing an observation in process pixels each of which represents a unique set of attributes, and wherein said attributes for each pixel comprise at least one of the following:
   a combination comprising at least two of time, range, range rate and Doppler frequency for the associated observation; and
   at least one of beam number, sub-array number and element number for the associated observation.

13. The radar system as claimed in claim 1, wherein the processor is configured to store a characteristic of a return signal representing an observation in an associated pixel wherein:
   said characteristic comprises at least one of amplitude, phase and frequency; or
   the observation represents one of a target, an item of clutter, or a 'null'.

14. The radar system as claimed in claim 1, wherein the receiver comprises at least one array comprising a plurality of receiving elements (or sub-arrays), each receiving element being configured to receive signals from substantially a whole volume of interest, thereby forming an associated signal channel.

15. The radar system as claimed in claim 14, wherein the receiver comprises a plurality of said arrays (or sub-arrays).

16. The radar system as claimed in claim 1, wherein said processor is configured for at least one of the following:
   forming a plurality of beams by combining different signal channels with suitable amplitude or phase weightings;
   forming a plurality of beams having substantially a different look direction; and
   forming a plurality of apertures with beams having substantially the same look direction.

17. The radar system as claimed in claim 16, wherein said beams are formed for each of a plurality of receiving elements and for each of a plurality of sub-arrays of receiving elements.

18. The radar system as claimed in claim 16, wherein said processor is configured for monopulse angular measurement using a plurality of said beams.

19. The radar system as claimed in claim 1, wherein said receiver comprises a planar array of receiving elements, or wherein said receiver comprises a non-planar array of receiving elements conformal to a known shape.

20. The radar system as claimed in claim 1, wherein said radar system is located at said wind farm and comprises a holographic radar.

21. The radar system as claimed in claim 1,
wherein said processor is configured to process signals received by a plurality of sub-arrays of receiving elements in a first data stream and a second data stream in parallel; and
wherein each data stream is processed using different amplitude or phase weightings, wherein said amplitude or phase weightings used for the first data stream are configured to provide a null in a direction of a land or sea surface thereby to reject surface targets, or wherein said amplitude or phase weightings used for the first data stream are configured to provide a null in the direction of raised objects thereby to reject such objects in favour of surface targets.

22. A method of obtaining information by a radar system, the method comprising:
transmitting radar signals into a region of a cluttered environment to illuminate said region with a signal modulated as a regular sequence of pulses at a given pulse rate;
receiving return signals, of said radar signals, reflected from within said region, and representing observations; and
processing the return signals to extract data, including clutter related data, for said region, said processing comprising integrating said return signals coherently and subject to a limit on the range and range rate associated with the observations that the return signals represent, within which limit said radar operates substantially unambiguously in range and range rate at said pulse rate, wherein said limit on the range and range rate is expressed by the inequality:

$$\left(\left|\frac{dR}{dt}\right|(\max) \times R(\max)\right) \leq \frac{c^2}{(8 \times F_{op})}$$

where R is the range and dR/dt is the range rate associated with the observation c is the seed of light, and $F_{op}$ is operating frequency of the radar system.

23. A radar system comprising:
a transmitter adapted to transmit radar signals into a region of a cluttered environment, which cluttered environment comprises a wind farm, to illuminate said region and said wind farm with a signal modulated as a regular sequence of pulses at a given pulse rate;
a receiver adapted to receive return signals, of said radar signals, reflected from within said region, and representing observations; and
a processor adapted to process the return signals to extract data, including wind farm related data, for said region, whereby to discriminate between observations representing targets of interest including aircraft and observations representing moving clutter including wind turbine blades, wherein said processor is operable to integrate said return signals coherently and subject to a limit on the range and range rate associated with the observations that the return signals represent, within which limit said radar operates substantially unambiguously in range and range rate at said pulse rate, wherein said limit on the range and range rate is expressed by the inequality:

$$\left(\left|\frac{dR}{dt}\right|(\max) \times R(\max)\right) \leq \frac{c^2}{(8 \times F_{op})}$$

where R is the range and dR/dt is the range rate associated with the observation c is the seed of light, and $F_{op}$ is operating frequency of the radar system.

* * * * *